United States Patent
Dodo

(10) Patent No.: US 7,481,310 B2
(45) Date of Patent: Jan. 27, 2009

(54) PANEL TRANSPORTATION DEVICE

(75) Inventor: Yasushi Dodo, Chiyoda-ku (JP)

(73) Assignee: IHI Corporation, Tokyo (JP)

( * ) Notice: Subject to any disclaimer, the term of this patent is extended or adjusted under 35 U.S.C. 154(b) by 93 days.

(21) Appl. No.: 10/555,084

(22) PCT Filed: May 19, 2004

(86) PCT No.: PCT/JP2004/006748

§ 371 (c)(1), (2), (4) Date: Oct. 31, 2005

(87) PCT Pub. No.: WO2004/103604

PCT Pub. Date: Dec. 2, 2004

(65) Prior Publication Data

US 2006/0214354 A1    Sep. 28, 2006

(30) Foreign Application Priority Data

| May 20, 2003 | (JP) | ............................. 2003-142399 |
| Feb. 23, 2004 | (JP) | ............................. 2004-045928 |
| Feb. 23, 2004 | (JP) | ............................. 2004-045975 |

(51) Int. Cl.
*B65G 7/08* (2006.01)
(52) U.S. Cl. ............... 198/465.3; 198/621.1; 198/468.2
(58) Field of Classification Search .............. 198/621.1, 198/468.2, 465.3
See application file for complete search history.

(56) References Cited

U.S. PATENT DOCUMENTS

| 4,345,864 A |   | 8/1982  | Smith, Jr. et al. |            |
| 5,842,370 A | * | 12/1998 | Hofele et al.    | ..... 72/405.09 |
| 5,899,108 A |   | 5/1999  | Hofele et al.    |            |
| 6,223,582 B1 | * | 5/2001  | Hofele et al.    | ..... 72/405.09 |
| 6,325,591 B1 |   | 12/2001 | Focke et al.     |            |

(Continued)

FOREIGN PATENT DOCUMENTS

JP    07-073756    3/1995

(Continued)

OTHER PUBLICATIONS

International Search Report issued in corresponding application No. PCT/JP2004/006748 completed Aug. 17, 2004 and mailed Sep. 7, 2004.

(Continued)

*Primary Examiner*—Gene O. Crawford
*Assistant Examiner*—Kavel P Singh
(74) *Attorney, Agent, or Firm*—Griffin & Szipl, P.C.

(57) ABSTRACT

A panel transportation device of the present invention has a panel grasp portion for grasping a panel, a link mechanism for moving the panel grasp portion in a panel transportation direction, and a slide mechanism for operating the link mechanism so as to move the panel grasp portion in the panel transportation direction and moving the entire link mechanism. The slide mechanism is constituted of a first slide mechanism with a first slide block and a second slide mechanism with a second slide block. The link mechanism is constructed such that the first slide block and the second slide block are connected to the panel grasp portion and the panel grasp portion is moved in the panel transportation direction by individually and linearly driving the first slide block and the second slide block.

18 Claims, 17 Drawing Sheets

U.S. PATENT DOCUMENTS

| | | |
|---|---|---|
| 6,374,994 B1 | 4/2002 | Hofele et al. |
| 6,374,995 B1 | 4/2002 | Hofele et al. |
| 6,382,400 B1 | 5/2002 | Hofele et al. |
| 6,428,267 B1 | 8/2002 | Terpstra |
| 6,450,757 B1 | 9/2002 | Saeki et al. |
| 6,557,235 B1 | 5/2003 | Katz et al. |
| 6,558,107 B1 | 5/2003 | Okuno |
| 6,715,981 B1 | 4/2004 | Harsch et al. |
| 7,001,139 B2 | 2/2006 | Mori et al. |
| 7,244,091 B2 | 7/2007 | Mori et al. |

FOREIGN PATENT DOCUMENTS

| | | |
|---|---|---|
| JP | 09-201735 | 8/1997 |
| JP | 10-328766 | 12/1998 |
| JP | 2001-038656 | 2/2001 |
| JP | 2001-088072 | 4/2001 |
| JP | 2002-200583 | 7/2002 |

OTHER PUBLICATIONS

Webster's New Collegiate Dictionary, 1977, United States of America, pp. 581 and 831.

* cited by examiner

PANEL TRANSPORTATION DEVICE

This is a National Phase Application in the United States of International Patent Application No. PCT/JP2004/006748 filed May 19, 2004, which claims priority on Japanese Patent Application No. 142399/2003, filed May 20, 2003, Japanese Patent Application No. 045975/2004, filed Feb. 23, 2004, and Japanese Patent Application No. 045928/2004, filed Feb. 23, 2004. The entire disclosures of the above patent applications are hereby incorporated by reference.

TECHNICAL FIELD

The present invention relates to a panel transportation device which transports a panel molded by a press or the like.

BACKGROUND ART

For example, a panel for an automobile has a complicated shape, so that a mold process is divided into several steps, and the panel is molded by linearly arranged molds. In a transfer press or tandem press using such a plurality of presses, a panel transportation device is provided to sequentially transport members (panels) molded in a certain press to a subsequent press.

A crossbar type transportation device in Patent document 1 below has heretofore been widely used as the panel transportation device for the transfer press. In this device, a lift beam extending throughout press stations is provided so as to be able to ascend and descend in a line direction; a carrier is further suspended from the lift beam so as to be able to reciprocate among the respective stations in the line direction; a crossbar is set to the carrier; and a work grasp portion is attached to the crossbar, whereby work materials of the respective stations are simultaneously and intermittently transported.

Such a crossbar type transportation device has the following characteristics.

(1) Feed motion of a molded panel among mold stations is generated under motion control by cam driving or by an AC servo motor.

(2) The panel is transported by composite motion in a feed direction (horizontal direction) and a lift direction (vertical direction), and a vacuum cup attached to a transportation tool called the crossbar sucks and transports the panel.

(3) The crossbars among the mold stations are coupled both in the feed direction and the lift direction, and the respective crossbars are interlocked with each other and make totally the same motion.

(4) A feed arm which generates the feed motion among the stations is generally located on a front or rear side of a series of feed devices generally constituted of a carriage connecting the crossbars and of a link mechanism thereof, and the feed motion is generated by swinging the arm.

Furthermore, in addition to the crossbar type transportation device described above, there have been proposed panel transportation devices described in Patent documents 2 to 3 and the like below.

In a "transfer feeder" described in Patent document 2, a pair of lift beams moved up and down by a lifter is provided with a plurality of carriers which are independently self-propelled by a linear motor, and the linear motor is used as a drive source to enable high-speed transportation of a work (panel).

In a "transfer press transportation device" as is described in Patent document 1, a plurality of carriers is provided in a lift beam, and a servo motor is used as a drive source for the carriers to enable high-speed transportation of a work (panel).

A transport and positioning system described in Patent document 3 comprises a driver 40 having a lever mechanism 33 with an output portion 35 which drives and positions a crossbar 32, as shown in FIG. 1. This lever mechanism 33 has a swing arm 34 forming the output portion 35 at one end, and the output portion 35 is coupled to the crossbar 32. Further, the swing arm 34 is coupled at two points: a support point 38 and a drive point 43 distanced from each other. The distance between the support point 38 and the drive point 43 is shorter than a distance between the output portion and the support point. It is to be noted that in FIG. 1, 31 denotes a work grasp portion attached to the crossbar 32; 42 denotes a guide rod coupling a slide block 47 with the drive point 43; 51 denotes a swing motor which swings the guide rod 42; and 55 denotes a direct acting device which moves the slide block 47 up and down.

In this configuration, the slide block 47 is moved up and down by the direct acting device 55, and the swing motor 51 swings the guide rod 42 to drive/position a tip (the drive point 43) of the guide rod 42, and then this motion is enlarged by a leverage ratio to drive/position the crossbar 32 to which the work grasp portion 31 is attached.

Patent document 1: Japanese Patent Publication Laid-open No. 10-328766

Patent document 2: Japanese Examined patent publication No. 7-73756

Patent document 3: U.S. Pat. No. 6,382,400

However, the panel transportation devices described in Patent document 1 described above have the following problems: (1) the respective crossbars cannot have motions different from each other; (2) the servo motor and a feed driver are increased in size since the crossbars for all the stations are simultaneously moved; and (3) since motion curves for the respective press stations are the same, a mold shape needs to be specially designed to avoid interference, which causes difficulty in accommodating diversification of plate molding. Further, in a linear motor method of Patent document 2, high-speed feeding can be achieved by the linear motor, but a lift mechanism is additionally needed, and this method therefore has a problem that an entire structure is complicated and large. An AC serve method of Patent document 1 has a problem that high rigidity cannot be obtained due to a serial link.

Furthermore, in a swing arm method of Patent document 3, since the panel is transported by the swing arm, a longer transportation distance requires more length of the arm, and, for example, deflection of the arm causes vibration. Moreover, because the panel transportation device in Patent document 3 comprises a slide mechanism vertically driven among the press stations, this device cannot be applied to the multi-slide type transfer press without an upright for installation of the slide mechanism. Further, in order to correspond to complicated press molding, a tilting device needs to be separately provided in the crossbar to tilt the work grasp portion, and there is thus a problem that the structure is complicated and weight of movable portions is increased to make it more difficult to achieve a high speed.

DISCLOSURE OF THE INVENTION

The present invention has been made to solve the foregoing problems. That is, it is a main object of the present invention to provide a panel transportation device wherein different motion can be made for each press station; movable portions can be easily reduced in weight; rigidity of the movable portions can be increased to restrain deflection and vibration; and the panel transportation device can also be applied to a multislide type transfer press. It is another object of the present invention to provide a panel transportation device in which a work grasp portion can be tilted without adding another device to the movable portions while the movable portions are reduced in weight.

In order to attain the object of the present invention, according to a first invention, there is provided a panel transportation device characterized by comprising: a panel grasp portion for grasping a panel; a link mechanism for moving the panel grasp portion in a panel transportation direction; and a slide mechanism for operating the link mechanism so as to move the panel grasp portion in the panel transportation direction and moving the entire link mechanism.

According to the first invention, the slide mechanism can operate the link mechanism and move the entire link mechanism to move the panel grasp portion in the panel transportation direction. Thus, the panel grasped by the panel grasp portion can be transported in a predetermined transportation direction. Further, since the panel transportation device of the present invention can be provided for each press station, each panel transportation device can have different motion for each press station. Still further, because the device itself can be compactly configured, it can also be applied to a multislide type press device.

A second invention is a preferred embodiment of the first invention, wherein a pair of link mechanisms and a pair of slide mechanisms are provided symmetrically to each other on both sides of the panel grasp portion.

According to the second invention, the panel can be stably transported.

A third invention is a preferred embodiment of the first invention, wherein the slide mechanism is constituted of a first slide mechanism and a second slide mechanism provided closer to a transportation line downstream side than the first slide mechanism. The first slide mechanism has a first slide block connected to the link mechanism, and is configured to linearly drive the first slide block in a direction inclined with respect to a horizontal plane so that the first slide block is at a high position on a transportation line upstream side and at a low position on the transportation line downstream side within a driving region of the first slide block. The second slide mechanism has a second slide block connected to the link mechanism, and is configured to linearly drive the second slide block in a direction inclined with respect to the horizontal plane so that the second slide block is at a low position on the transportation line upstream side and at a high position on the transportation line downstream side within a driving region of the second slide block. The link mechanism is constructed such that the first slide block and the second slide block are connected to the panel grasp portion and the panel grasp portion is moved in the panel transportation direction by individually and linearly driving the first slide block and the second slide block.

According to the third invention, by directly driving the first slide block and the second slide block moving in the V-shaped driving region, the panel grasp portion connected to these slide blocks via the link mechanism can be moved in the panel transportation direction. Thus, the panel grasped by the panel grasp portion can be transported in the predetermined transportation direction.

A fourth invention is a preferred embodiment of the third invention, wherein the link mechanism comprises an output member connected to the panel grasp portion; a first link whose one end is pivotally connected to the output member and whose other end is pivotally connected to the first slide block; and a second link whose one end is pivotally connected to the output member and whose other end is pivotally connected to the second slide block.

According to the fourth invention, the first slide block is driven to move the first link and the second slide block is driven to move the second link so that the link mechanism is moved, thereby making it possible to move the panel grasp portion connected to the output member in the predetermined transportation direction.

A fifth invention is a preferred embodiment of the fourth invention, wherein the first link comprises two arms, and each of the two arms has one end pivotally connected to the output member and the other end pivotally connected to the first slide block.

According to the fifth invention, the output member can be held in a constant posture via the two arms, and a work grasp portion attached to the output member is held in a constant posture, thereby enabling stable panel transportation.

A sixth invention is a preferred embodiment of the fifth invention, wherein the first slide block is constituted of two slide blocks. The first slide mechanism comprises two driving means for individually driving the two slide blocks. The other ends of the two arms are pivotally connected to the two slide blocks. Relative positions of the two slide blocks are changed to tilt the panel grasp portion connected to the output member.

According to the sixth invention, since the panel grasp portion can be tilted, the panel can be grasped/mounted at an optimum angle as required.

A seventh invention is a preferred embodiment of the fifth invention, wherein a straight line passing pivotal connection points of the two arms and the first slide block and/or a straight line passing pivotal connection points of the two arms and the output member is/are inclined with respect to the horizontal plane so that it is possible to always hold a state where the two arms do not interfere with each other in a figure viewed from a transportation line width direction.

According to the seventh invention, since the straight line passing the pivotal connection points of the two arms and the first slide block and/or the straight line passing the pivotal connection points of the two arms and the output member is/are inclined with respect to the horizontal plane so that it is possible to always hold the state where the two arms do not interfere with each other in the figure viewed from the transportation line width direction, the first link always constructs a quadrilateral link, and a mechanical dead point of the link mechanism can be eliminated in any position of a panel transportation operation. It is thereby possible to obtain an advantage that controllability can be significantly improved.

An eighth invention is a preferred embodiment of the sixth invention, wherein a straight line passing pivotal connection points of the two arms and the first slide block and/or a straight line passing pivotal connection points of the two arms and the output member is/are inclined with respect to the horizontal plane so that it is possible to always hold a state where the two arms do not interfere with each other in a figure viewed from a transportation line width direction.

According to the eighth invention, since the straight line passing the pivotal connection points of the two arms and the first slide block and/or the straight line passing the pivotal connection points of the two arms and the output member is/are inclined with respect to the horizontal plane so that it is possible to always hold the state where the two arms do not interfere with each other in the figure viewed from the transportation line width direction, the first link always constructs a quadrilateral link, and a mechanical dead point of the link mechanism can be eliminated in any position of a panel transportation operation. It is thereby possible to obtain an advantage that controllability can be significantly improved.

A ninth invention is a preferred embodiment of the fourth invention, wherein the second link comprises two arms, and each of the two arms has one end pivotally connected to the output member and the other end pivotally connected to the second slide block.

According to the ninth invention, the output member can be held in a constant posture via the two arms, and the work grasp portion connected to the output member is held in a constant posture, thereby enabling stable panel transportation.

A tenth invention is a preferred embodiment of the ninth invention, wherein the second slide block is constituted of two slide blocks. The second slide mechanism comprises two driving means for individually driving the two slide blocks. The other ends of the two arms are pivotally connected to the two slide blocks. Relative positions of the two slide blocks are changed to tilt the panel grasp portion connected to the output member.

According to the tenth invention, since the panel grasp portion can be tilted, the panel can be grasped/mounted at an optimum angle as required.

An eleventh invention is a preferred embodiment of the ninth invention, wherein a straight line passing pivotal connection points of the two arms and the second slide block and/or a straight line passing pivotal connection points of the two arms and the output member is/are inclined with respect to the horizontal plane so that it is possible to always hold a state where the two arms do not interfere with each other in a figure viewed from a transportation line width direction.

According to the eleventh invention, since the straight line passing the pivotal connection points of the two arms and the second slide block and/or the straight line passing the pivotal connection points of the two arms and the output member is/are inclined with respect to the horizontal plane so that it is possible to always hold the state where the two arms do not interfere with each other in the figure viewed from the transportation line width direction, the second link always forms a quadrilateral link, and mechanical dead point of the link mechanism can be eliminated in any position of a panel transportation operation. It is thereby possible to obtain an advantage that controllability can be significantly improved.

A twelfth invention is a preferred embodiment of the tenth invention, wherein a straight line passing pivotal connection points of the two arms and the second slide block and/or a straight line passing pivotal connection points of the two arms and the output member is/are inclined with respect to the horizontal plane so that it is possible to always hold a state where the two arms do not interfere with each other in a figure viewed from a transportation line width direction.

According to the twelfth invention, since the straight line passing the pivotal connection points of the two arms and the second slide block and/or the straight line passing the pivotal connection points of the two arms and the output member is/are inclined with respect to the horizontal plane so that it is possible to always hold the state where the two arms do not interfere with each other in the figure viewed from the transportation line width direction, the second link always forms a quadrilateral link, and a mechanical dead point of the link mechanism can be eliminated in any position of a panel transportation operation. It is thereby possible to obtain an advantage that controllability can be significantly improved.

A thirteenth invention is a preferred embodiment of the third invention, wherein the panel transportation device comprises a tilt mechanism for tilting the panel grasp portion, and the tilt mechanism comprises a rotary actuator installed in the first slide block or the second slide block, and a transmission mechanism for transmitting rotary driving of the rotary actuator to tilt the panel grasp portion.

According to the thirteenth invention, since the panel grasp portion can be tilted by the tilt mechanism, the panel can be grasped/mounted at an optimum angle as required. Further, since the tilt mechanism comprises the rotary actuator installed in the slide block and the transmission mechanism, the mechanism can be constructed in a simple manner. Still further, since the tilt mechanism and the link mechanism are separately configured, the mechanical dead point of the link mechanism can be eliminated. Thus, the controllability is significantly improved.

A fourteenth invention is a preferred embodiment of the thirteenth invention, wherein the transmission mechanism comprises a first arm whose one end is fixed to a drive shaft of the rotary actuator, a second arm whose one end is fixed to or integrally formed in the output member or the panel grasp portion, and a coupling rod whose one end is pivotally connected to the other end of the first arm and whose other end is pivotally connected to the other end of the second arm and which couples the first arm with the second arm.

According to the fourteenth invention, the rotary driving of the rotary actuator is transmitted to the panel grasp portion via the first arm, the coupling rod and the second arm, so that the panel grasp portion can be tilted. The first link or the second link and the coupling rod have the same length, and the first arm and the second arm have the same length. Consequently, they maintain a parallelogram, so that during normal transportation without tilt operation, the panel grasp portion can be always maintained in a constant posture without driving the rotary actuator.

A fifteenth invention is a preferred embodiment of the thirteenth invention, wherein the transmission mechanism comprises a first pulley fixed to the drive shaft of the rotary actuator, a second pulley fixed to or integrally formed in the output member or the panel grasp portion, and a drive belt for transmitting rotary driving of the first pulley to the second pulley.

According to the fifteenth invention, the rotary driving of the rotary actuator is transmitted to the panel grasp portion via the first pulley, the drive belt and the second pulley, so that the panel grasp portion can be tilted. Furthermore, a ratio of nominal diameter of the first pulley to that of the second pulley is 1 to 1, so that during normal transportation without tilt operation, the panel grasp portion can be always maintained in a constant posture without driving the rotary actuator.

A sixteenth invention is a preferred embodiment of the third invention, wherein the first slide mechanism and the second slide mechanism comprise direct acting actuators which linearly drive the first slide block and the second slide block.

According to the sixteenth invention, the first slide and the second slide are driven by the direct acting actuators to allow an operation to be directly transmitted to the link mechanism.

A seventeenth invention is a preferred embodiment of the sixteenth invention, wherein the direct acting actuator is a ball screw with a ball nut, a timing belt, a hydraulic cylinder, a rack and pinion, or a linear motor.

According to the seventeenth invention, the slides can be linearly moved at a high speed and accurately positioned by using the direct acting actuators.

An eighteenth invention is a preferred embodiment of the seventeenth invention, wherein the panel grasp portion comprises a crossbar connected to the link mechanism, and a work grasp portion attached to the crossbar.

According to the eighteenth invention, the crossbar is moved by the link mechanism, so that the work grasp portion attached to the crossbar can make a predetermined movement.

Other objects and advantageous features of the present invention will be apparent from a description below with reference to the accompanying drawings.

BEST MODE FOR CARRYING OUT THE INVENTION

Preferred embodiments of the present invention will hereinafter be described in detail with reference to the accompanying drawings. It is to be noted that the same numerals are assigned to common parts throughout the drawings and redundant explanation is omitted.

Figure 1:
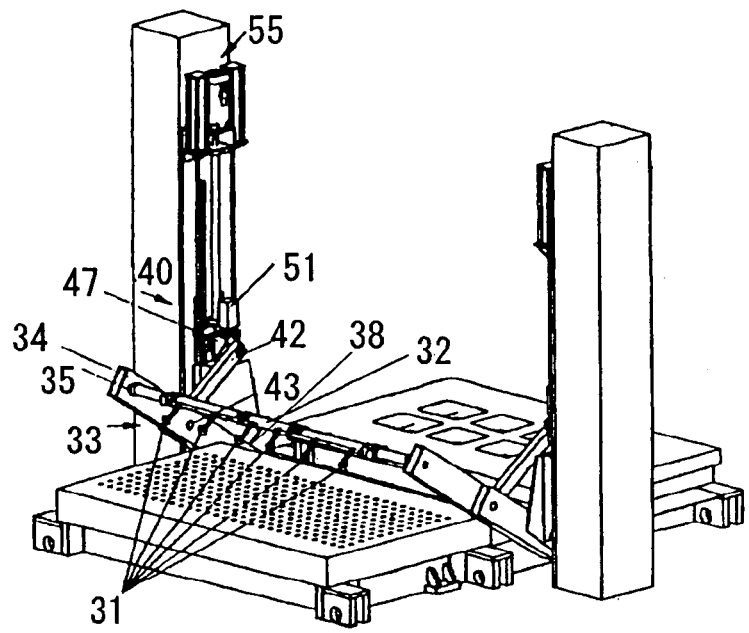
FIG. 1 is a diagram showing a panel transportation device according to a prior art.
Figure 2:
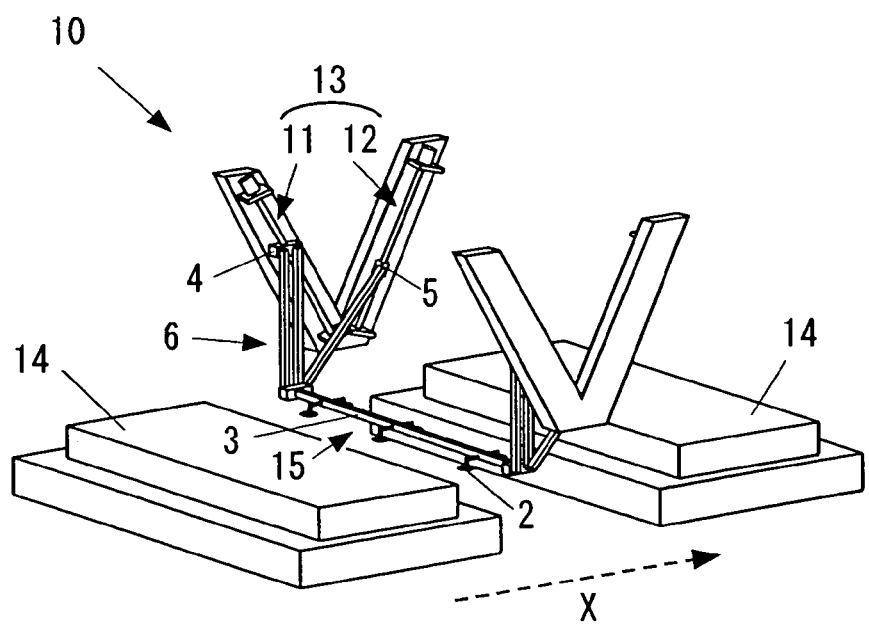
FIG. 2 is a perspective view showing a first embodiment of the present invention.
Figure 3:
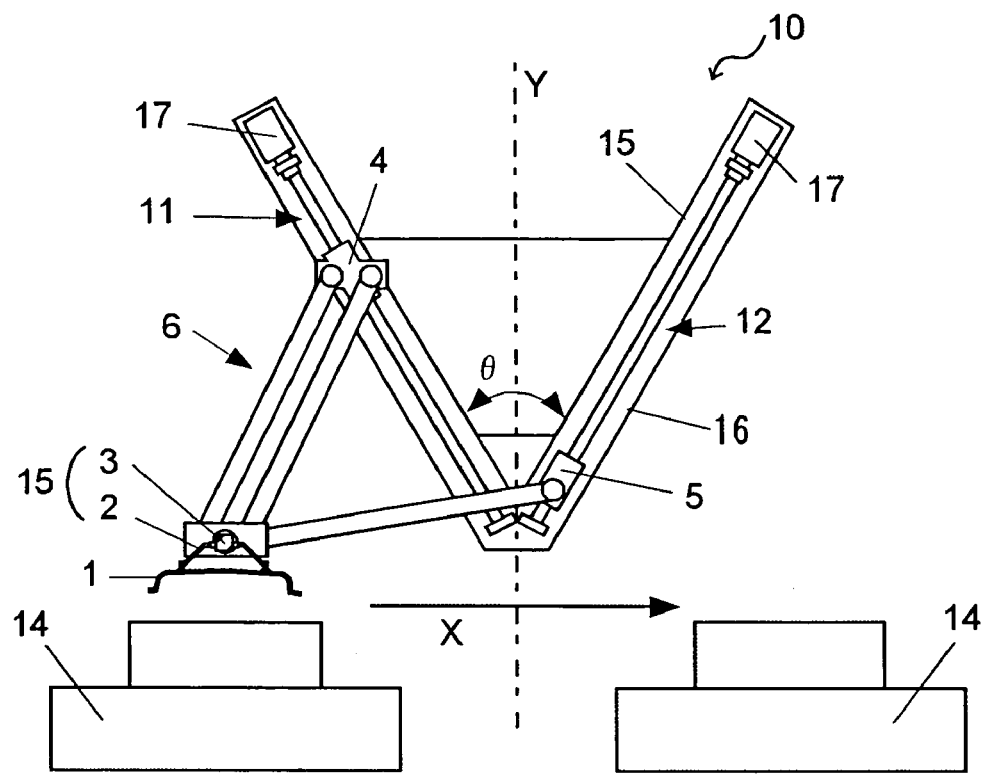
FIG. 3 is a configuration diagram showing the first embodiment of the present invention.

FIGS. 2 and 3 are diagrams showing a panel transportation device according to a first embodiment of the present invention. FIG. 2 is a perspective view showing a panel transportation device 10, and FIG. 3 is a configuration diagram showing a figure of the panel transportation device 10 of FIG. 2 from the inside of a transportation line width direction. In this drawing, there are shown, for convenience of explanation, two press stations 14 on an upstream side and a downstream side, and the panel transportation device 10 of the present invention provided between these press stations. In actual equipment, about two to five press stations are generally provided. It is to be noted that in the present description, the "upstream side" and the "downstream side" mean an upstream side and a downstream side of a transportation line, respectively.

As shown in FIGS. 2 and 3, the panel transportation device 10 is disposed between the press stations 14, 14 to receive a molded material (panel) from the upstream press station 14 and transport it to the downstream press station 14. Moreover, the panel transportation device 10 is disposed between the press stations 14, 14 by attaching its both ends to the upstream and downstream press stations 14 or to arms provided in an unshown press stand, or by suspending the panel transportation device 10 from a ceiling.

The panel transportation device 10 comprises a panel grasp portion 15; a pair of link mechanisms 6 connected symmetrically to each other on both sides of the panel grasp portion 15; and slide mechanisms 13 which cause the link mechanisms 6 to perform a predetermined operation. These mechanisms operate symmetrically to each other so that the panel grasp portion 15 is moved in a feed direction and upward/downward direction and panels 1 are sequentially transported to a next press station.

The panel grasp portion 15 comprises a work grasp portion 2 such as a vacuum cup which sucks the panel (work 1), and a crossbar 3 to which the work grasp portion 2 is attached and which extends in a direction perpendicular to the transportation line. The link mechanisms 6 are connected to both ends of the crossbar 3.

The slide mechanism 13 is constituted of a first slide mechanism 11 with a first slide block 4 and a second slide mechanism 12 with a second slide block 5. The first slide mechanism 11 and the second slide mechanism 12 are attached to a V-shaped base member 16. Further, the two slide mechanisms 11, 12 comprise direct acting actuators having the same length. By driving these direct acting actuators, the first slide block 4 and the second slide block 5 are linearly driven and can be accurately positioned by, for example, numerical control. 17 denotes a drive motor for the direct acting actuator. In the present embodiment, the direct acting actuator is a ball screw with a ball nut, but the present invention is not limited thereto, and the direct acting actuator may be a timing belt, a hydraulic cylinder, a rack and pinion, a linear motor or the like.

The first slide mechanism 11 is configured to linearly drive the first slide block 4 in a direction inclined with respect to a horizontal plane so that the first slide block 4 is at a high position on the transportation line upstream side and at a low position on the transportation line downstream side within a driving region of the first slide block 4. Moreover, the second slide mechanism 12 is configured to linearly drive the second slide block 5 in a direction inclined with respect to the horizontal plane so that the second slide block 5 is at the low position on the transportation line upstream side and at a high position on the downstream side within a driving region of the second slide block 5. The second slide mechanism 12 is disposed closer to the transportation line downstream side than the first slide mechanism 11, and is provided axially symmetrically to the first slide mechanism 11 with respect to an axis Y vertical to the horizontal plane.

Lines of the two slide mechanisms 11, 12 extending downward in a slide direction cross each other, and an angle θ formed therebetween is set at 60°. It is to be noted that the formed angle θ is individually determined for each press device by a space between the press stations 14, 14, that is, by a transportation distance of the panel 1, and it is not limited to the above-mentioned angle.

Furthermore, in the present embodiment, the first slide mechanism 11 and the second slide mechanism 12 constitute a V-shaped slide mechanism in which their downward extension lines cross each other, but they are not limited thereto. For example, the first slide mechanism 11 and the second slide mechanism 12 may constitute an inverted-V-shaped slide mechanism in which their upward extension lines cross each other, or may constitute an X-shaped slide mechanism in which the first slide mechanism 11 and the second slide mechanism 12 are displaced in the transportation line width direction to cross their driving regions.

Figure 4:
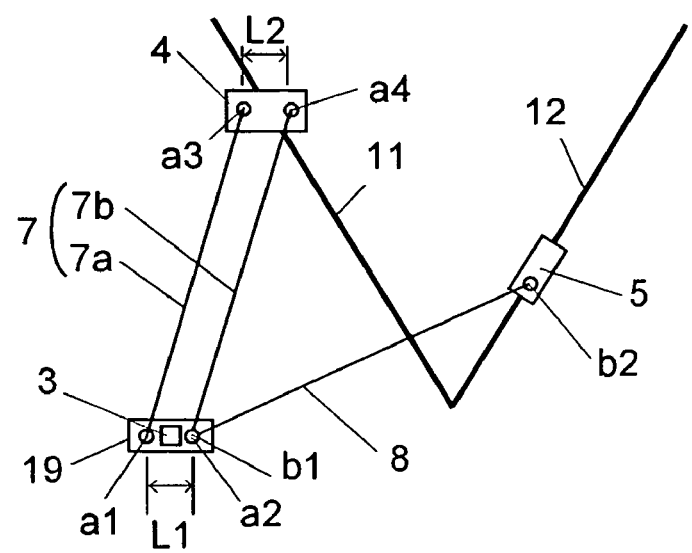
FIG. 4 is a schematic diagram showing the first embodiment of the present invention.

FIG. 4 is a schematic diagram of the panel transportation device 10 of FIGS. 2 and 3. As shown in this drawing, the link mechanism 6 comprises an output member 19 connected to both ends of the panel grasp portion 15 (crossbar 3), and a first link 7 and a second link 8 pivotally connected to the output member 19.

The first link 7 comprises two arms 7a, 7b having an equal length, and each of the two arms 7a, 7b has one end pivotally connected to the output member 19 so as to be able to rotate around a horizontal axis (their pivotal connection points are indicated by a1, a2 from the left) and the other end pivotally connected to the first slide block 4 so as to be able to rotate around a horizontal axis (their pivotal connection points are indicated by a3, a4 from the left). The second link 8 comprises an arm having a length equal to that of the two arms 7a, 7b of the first link 7, and has one end pivotally connected to the output member 19 so as to be able to rotate around a horizontal axis (its pivotal connection point is indicated by b1.) and the other end pivotally connected to the second slide block 5 so as to be able to rotate around a horizontal axis (its pivotal connection point is indicated by b2.). It is to be noted that in this drawing, the pivotal connection point a2 and the pivotal connection point b1 are located on the same axis, but they are not always need to be on the same axis.

A distance L1 between the pivotal connection points a1, a2 is set equal to a distance L2 between the pivotal connection points a3, a4. According to this configuration, the two arms 7a, 7b are maintained in parallel with each other, so that the output member 19 can always be held at a predetermined angle to the horizontal plane. That is, a parallel link a1, a2, a4, a3 is constructed, and even when a position of the output member 19 is changed, the output member 19 can be horizontally positioned, and horizontally held without tilting the panel grasp portion 15 (crossbar 3) attached to the output member 19.

FIGS. 5A to 5G are diagrams explaining a panel transportation operation of the panel transportation device according to the first embodiment of the present invention. In these drawings, P indicates a panel grasp position of the upstream press station, and Q indicates a panel mounting position of the downstream press station.

Figure 5A:
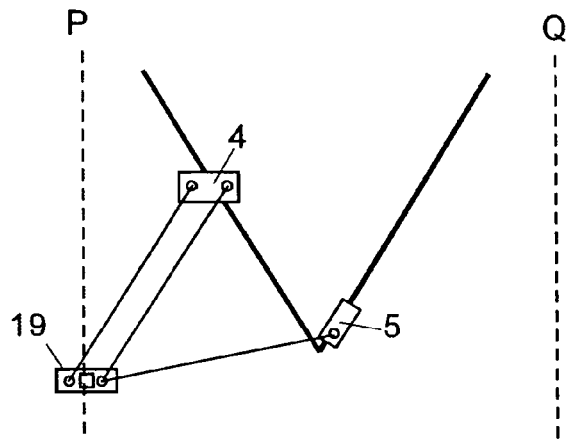
FIG. 5A is a diagram explaining a panel transportation operation of the panel transportation device according to the first embodiment of the present invention.

FIG. 5A shows a position where the panel in the upstream press station is grasped. From this position, the first slide block 4 and the second slide block 5 are linearly driven obliquely and upwardly at a predetermined speed, thereby lifting the position of the output member 19 to a position in FIG. 5B.

Figure 5B:
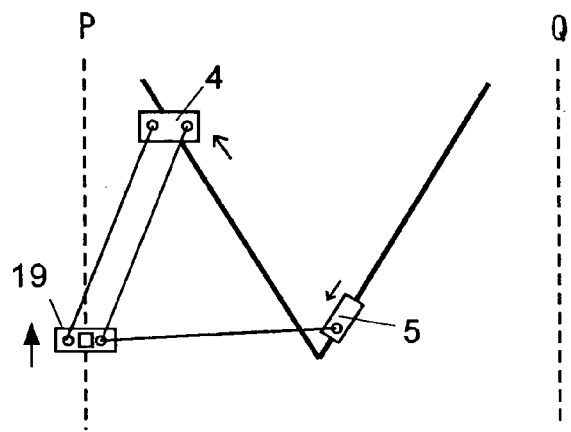
FIG. 5B is a diagram explaining the panel transportation operation of the panel transportation device according to the first embodiment of the present invention.
Figure 5C:
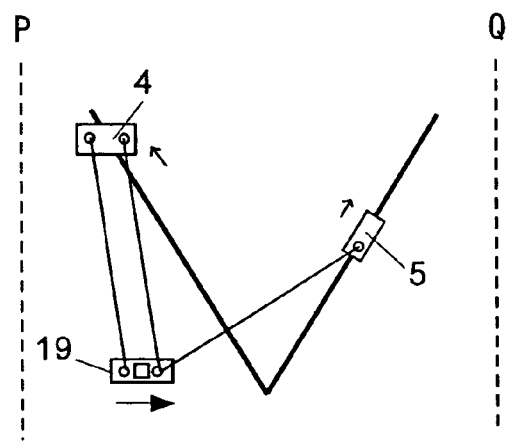
FIG. 5C is a diagram explaining the panel transportation operation of the panel transportation device according to the first embodiment of the present invention.
Figure 5D:
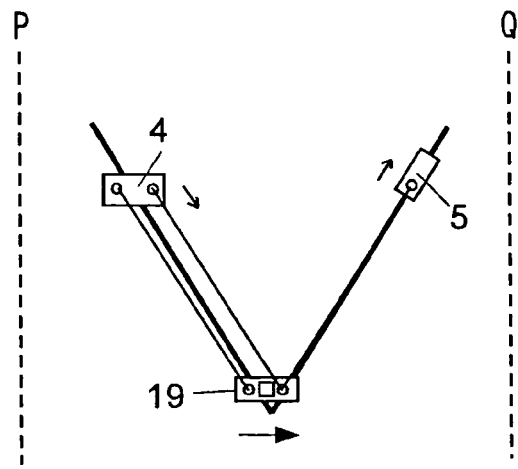
FIG. 5D is a diagram explaining the panel transportation operation of the panel transportation device according to the first embodiment of the present invention.

The first slide block 4 and the second slide block 5 are linearly driven obliquely and upwardly at the predetermined speed from the position in FIG. 5B to move the entire link mechanism 6 in a panel transportation direction while swiveling the link mechanism 6, thereby bringing the output member 19 attached to a tip of the link mechanism 6 to a position in FIG. 5C. At this time, each of the slide blocks 4, 5 is controlled so that the output member 19 substantially linearly moves in the panel transportation direction from the position in FIG. 5B. Subsequently, the first slide block 4 is slightly obliquely and downwardly driven and the second slide block 5 obliquely and upwardly driven, so that the link mechanism 6 further moves in the panel transportation direction while swiveling, and the output member 19 moves to a point in the vicinity of lowermost points of the first slide mechanism 11 and the second slide mechanism 12 as shown in FIG. 5D.

Figure 5E:
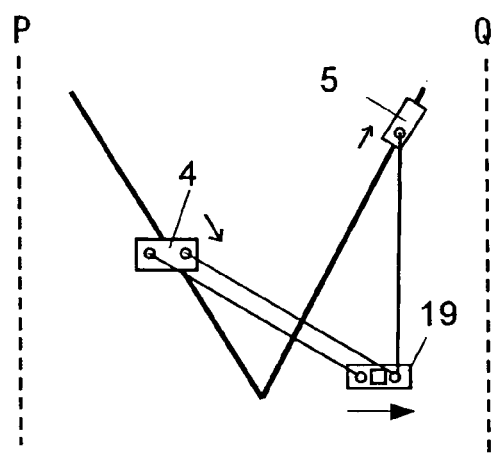
FIG. 5E is a diagram explaining the panel transportation operation of the panel transportation device according to the first embodiment of the present invention.
Figure 5F:
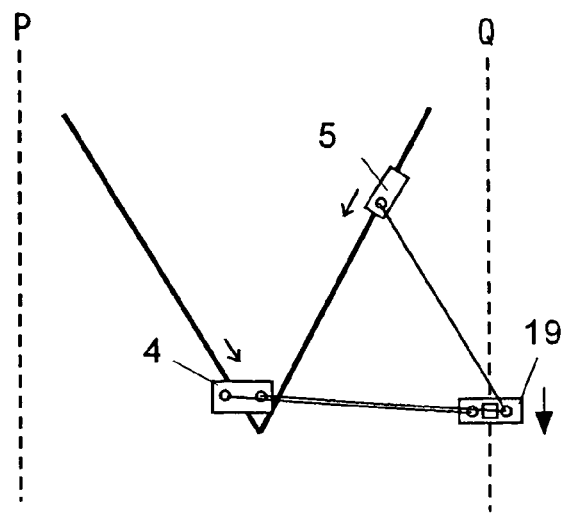
FIG. 5F is a diagram explaining the panel transportation operation of the panel transportation device according to the first embodiment of the present invention.
Figure 5G:
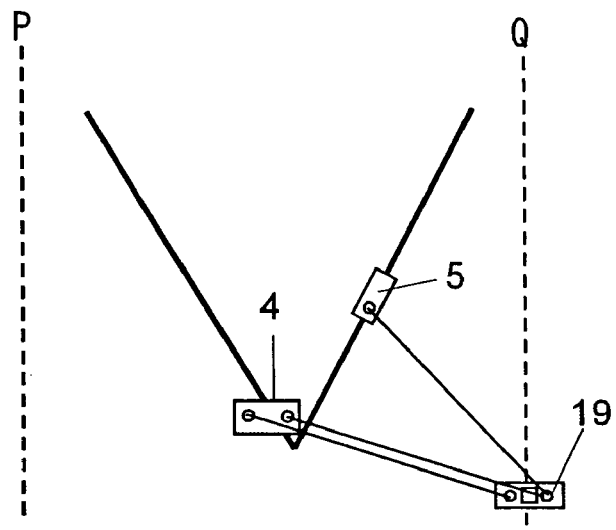
FIG. 5G is a diagram explaining the panel transportation operation of the panel transportation device according to the first embodiment of the present invention.

Furthermore, the first slide block 4 is obliquely and downwardly driven and the second slide block 5 is obliquely and upwardly driven, thereby linearly moving the output member 19 in the panel transportation direction to bring it to a position in FIG. 5E. Then, the first slide block 4 and the second slide block 5 are driven obliquely and downwardly at the predetermined speed to bring them to positions in FIG. 5F, and the slide blocks 4, 5 are further driven obliquely and downwardly from the positions in FIG. 5F, thus resulting in the panel mounting position in FIG. 5G.

Figure 6:
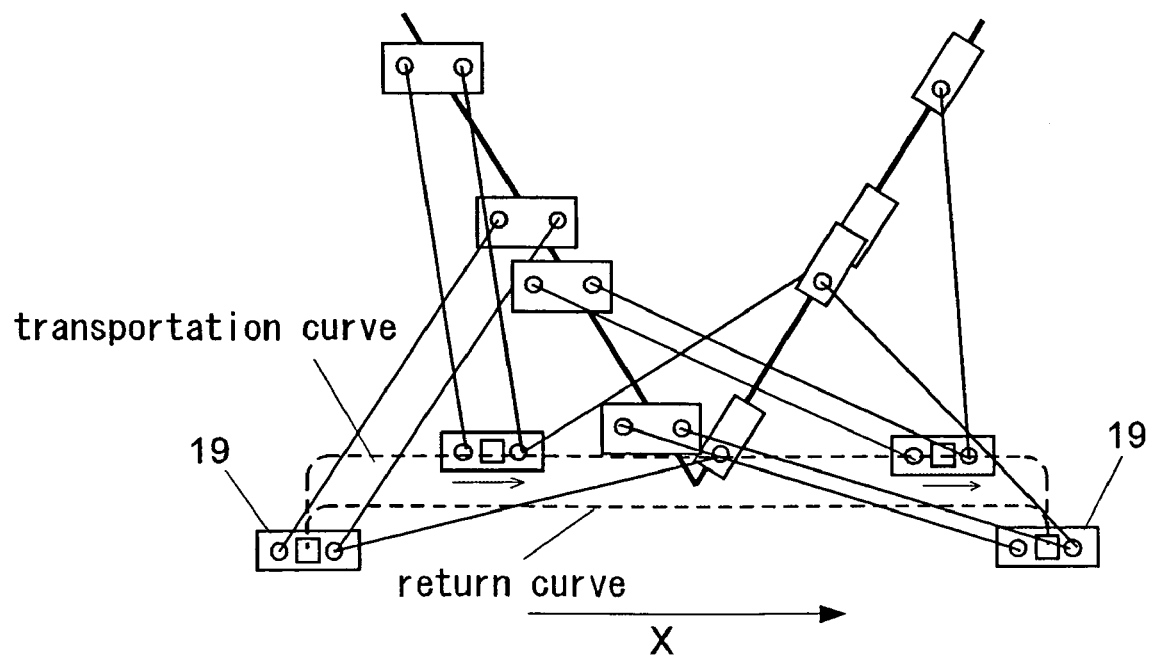
FIG. 6 is a diagram showing motion curves of the panel transportation device according to the first embodiment of the present invention.

FIG. 6 is a diagram showing motion curves of the panel transportation device 10 of FIG. 2. As shown in this drawing, in accordance with operations in FIGS. 5A to 5G, the material (panel) molded in the upstream press station is lifted by grasping it with the work grasp portion (not shown) attached to the output member 19, and transported in the feed direction, and then lowered in the downstream press station, thereby allowing the panel to be positioned at a mold position on a mold. Subsequently, the output member is returned to a predetermined standby position while leaving the panel in the downstream press station, and molding is implemented in each press station.

According to the first embodiment of the present invention, by linearly driving the first slide block 4 and the second slide block 5 at the predetermined speed in predetermined directions, the link mechanism 6 comprising the first link 7 and the second link 8 is swiveled, and the panel grasp portion 15 attached to the output member 19 connected to the tip of the link mechanism 6 can be moved in the panel transportation direction. Thus, movable portions can be reduced in size and weight without needing to provide the movable portions with drivers, and rigidity of the movable portions can be increased to restrain deflection and vibration. Further, this panel transportation device can be provided for each press station, and can have different motion for each press station.

It is to be noted that a case where the first link 7 constructs the parallel link has been described in the first embodiment, but this is not a limitation. In an alternative embodiment, the second link 8 may construct the parallel link to hold the panel grasp portion 15 horizontal. Moreover, the parallel link does not need to be constructed depending on a shape of the output member 19 and on how the crossbar 3 is attached.

Figure 7:
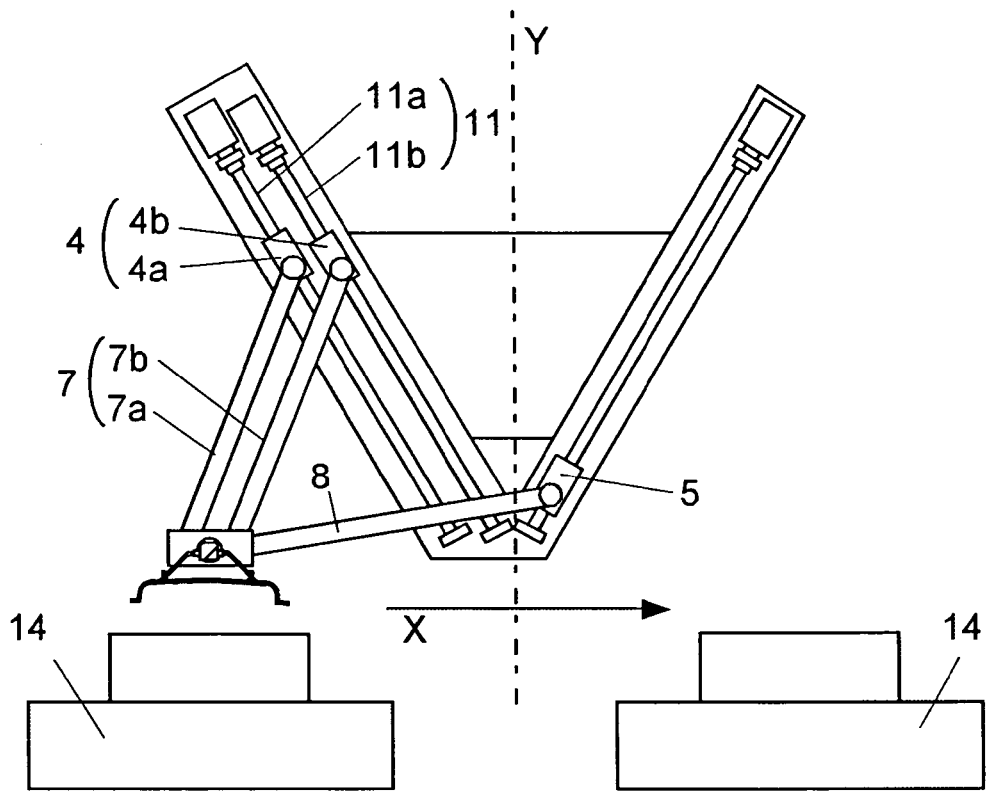
FIG. 7 is a configuration diagram showing a second embodiment of the present invention.

Next, a panel transportation device according to a second embodiment of the present invention will be described. FIG. 7 is a configuration diagram of the panel transportation device according to the second embodiment.

In the second embodiment, the first slide block 4 comprises two independent slide blocks 4a, 4b. Two arms 7a, 7b are pivotally connected to the output member 19 at one end, the other end of the arm 7a is pivotally connected to the slide block 4a (left side in the drawing), and the other end of the arm 7b is pivotally connected to the slide block 4b (right side in the drawing) so that they can rotate around horizontal axis in the drawing.

The first slide mechanism 11 is constituted of independent two slide mechanisms 11a, 11b which individually drive the two slide blocks 4a, 4b. The two slide mechanisms 11a, 11b are configured by arranging the slide mechanisms similar to the first slide mechanism 11 in the first embodiment in parallel so as to be displaced in a transportation line direction and arranging them.

Figure 8:
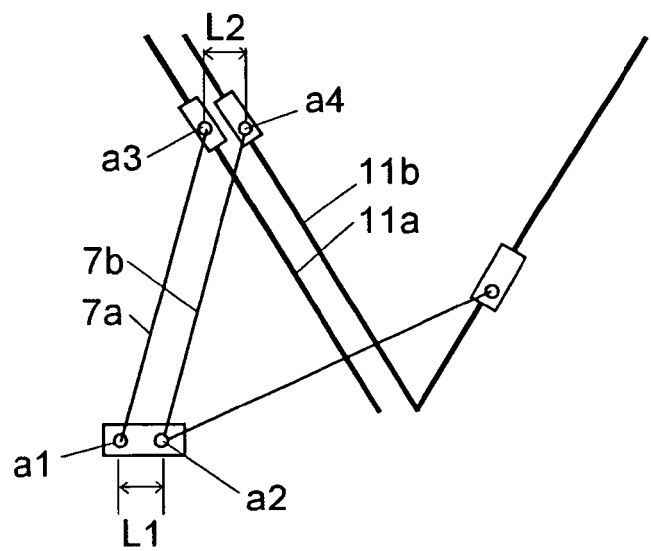
FIG. 8 is a schematic diagram showing the second embodiment of the present invention.

FIG. 8 is a schematic diagram of the panel transportation device of FIG. 7. The two slide mechanisms 11a, 11b are disposed so that a distance L2 between the pivotal connection points a3, a4 may be as long as the distance L1 between the pivotal connection points a1, a2. The pivotal connection points a1, a2, a4, a3 construct the parallel link.

Figure 9A:
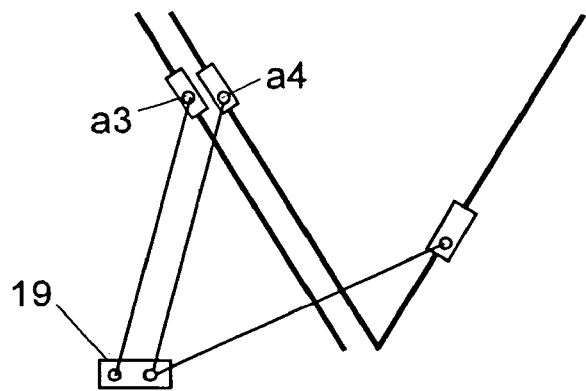
FIG. 9A is a diagram explaining a tilt operation of the panel transportation device according to the second embodiment of the present invention.
Figure 9B:
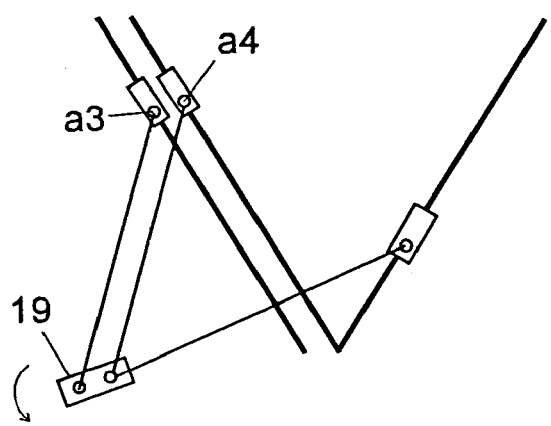
FIG. 9B is a diagram explaining the tilt operation of the panel transportation device according to the second embodiment of the present invention.
Figure 9C:
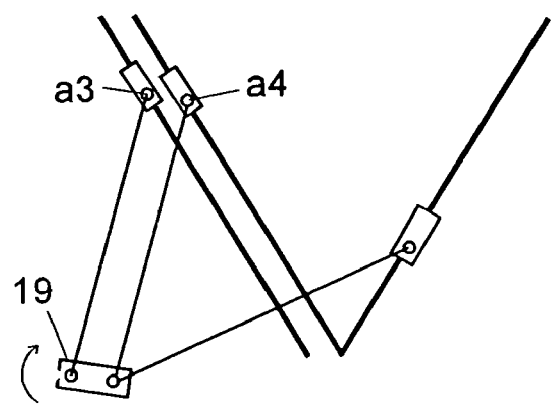
FIG. 9C is a diagram explaining the tilt operation of the panel transportation device according to the second embodiment of the present invention.

FIGS. 9A to 9C are diagrams explaining a tilt operation of the panel transportation device of FIG. 7. FIG. 9A shows a case in which the two slide blocks 4a, 4b are driven at a position where the pivotal connection points a3 and a4 hold the same height. FIG. 9B shows a case in which the two slide blocks 4a, 4b are driven at a position where the pivotal connection point a3 is lower than the pivotal connection point a4, wherein relative positions of the pivotal connection points a3, a4 are changed to tilt the output member 19 via the two arms 7a, 7b. FIG. 9C shows a case in which the two slide blocks 4a, 4b are driven at a position where the pivotal connection point a3 is higher than the pivotal connection point a4, wherein the output member is tilted in a direction reverse to that in FIG. 9B. Thus, the first slide block 4 is constituted of the two independent slide blocks 4a, 4b, and the two slide blocks 4a, 4b are driven at different heights (at changed relative positions) by the separate slide mechanisms 11a, 11b to tilt the output member 19, thereby allowing the panel grasp portion 15 attached to the output member 19 to be tilted. Thus, the panel can be grasped/mounted at an optimum angle as required.

Figure 10A:
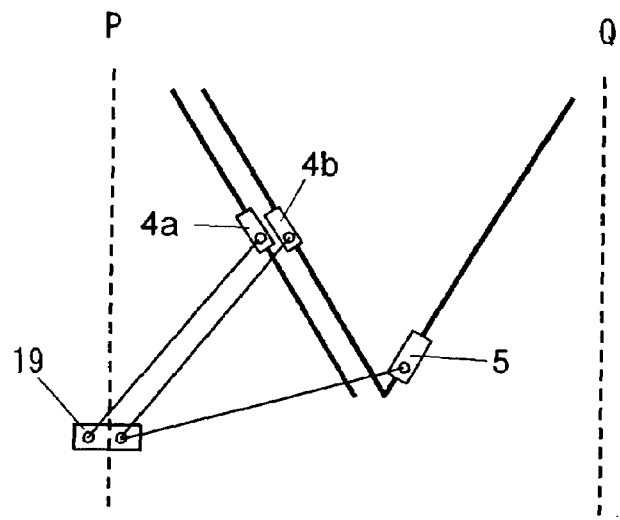
FIG. 10A is a diagram explaining a panel transportation operation of the panel transportation device according to the second embodiment of the present invention.
Figure 10B:
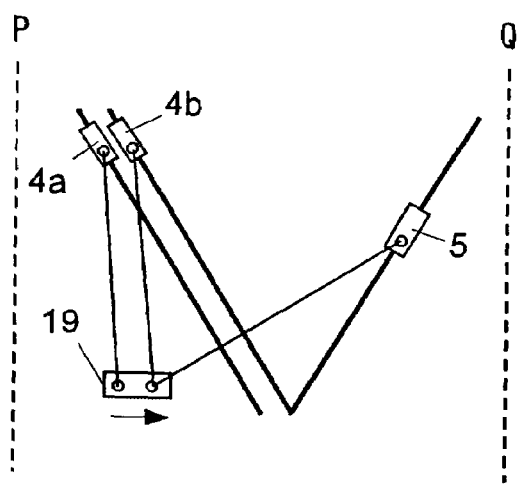
FIG. 10B is a diagram explaining the panel transportation operation of the panel transportation device according to the second embodiment of the present invention.
Figure 10C:
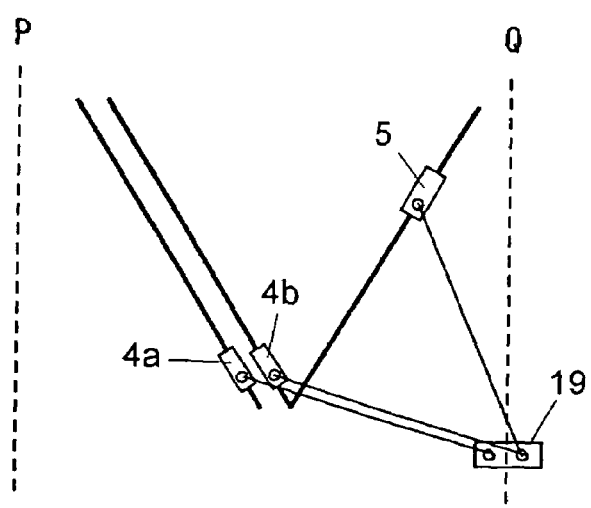
FIG. 10C is a diagram explaining the panel transportation operation of the panel transportation device according to the second embodiment of the present invention.

It is to be noted that the relative positions of the pivotal connection points a3, a4 between the two slide blocks 4a, 4b and the two arms 7a, 7b pivotally connected to the slide blocks 4a, 4b are generally controlled to be maintained in a state of FIG. 9A, so that the panel transportation operation is substantially similar to that in the first embodiment as simply shown in FIGS. 10A to 10C except when the above-mentioned tilt operation is performed.

According to second embodiment of the present invention, the first slide block 4 is constituted of the two independent slide blocks 4a, 4b, and the two slide blocks 4a, 4b are driven at different heights (at changed relative positions) by the separate slide mechanisms 11a, 11b to tilt the output member 19, thereby making it possible to obtain an advantage, in addition to an advantage by the first embodiment, that the panel grasp portion 15 attached to the output member 19 can be tilted. Thus, the panel can be grasped/mounted at an optimum angle as required.

It is to be noted that the first link 7 does not always need to construct the parallel link depending on the shape of the output member 19 and on how the crossbar 3 is attached, as in the first embodiment. Further, the case has been described in a second embodiment wherein the first slide block 4 comprises two slides. Conversely, in an alternative embodiment, it is also possible to have a configuration in which the second slide 5 comprises two slides, in which case configurations as shown in FIG. 8 may be built axially symmetrical with respect to the axis Y.

Figure 11:
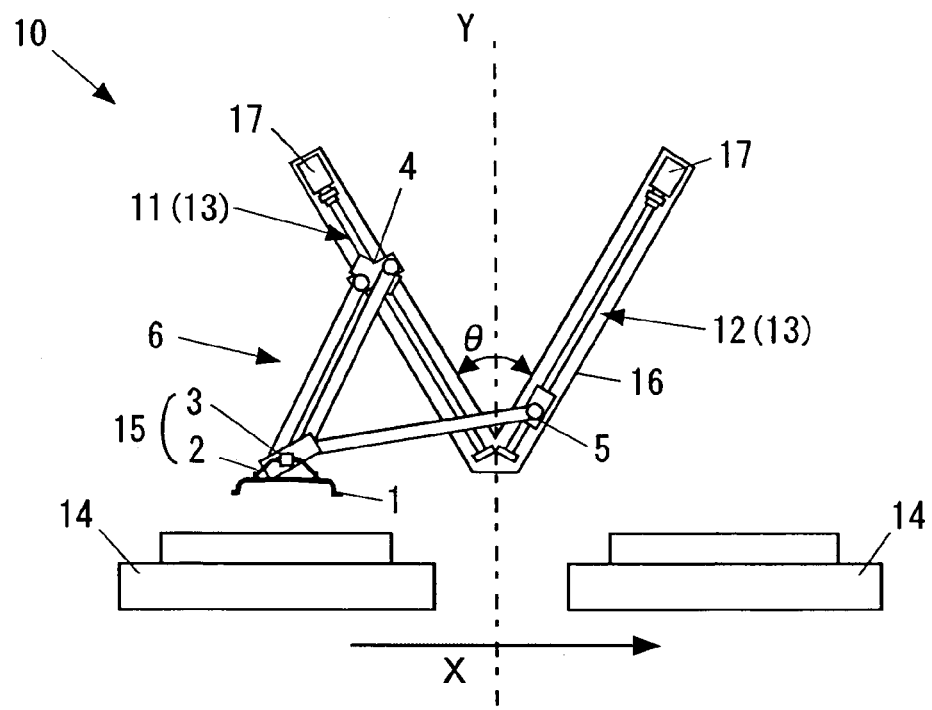
FIG. 11 is a configuration diagram showing a third embodiment of the present invention.

Next, a panel transportation device according to the third embodiment of the present invention will be described. FIG. 11 is a configuration diagram of the panel transportation device according to the third embodiment, and FIG. 12 is a schematic diagram thereof.

Figure 13:
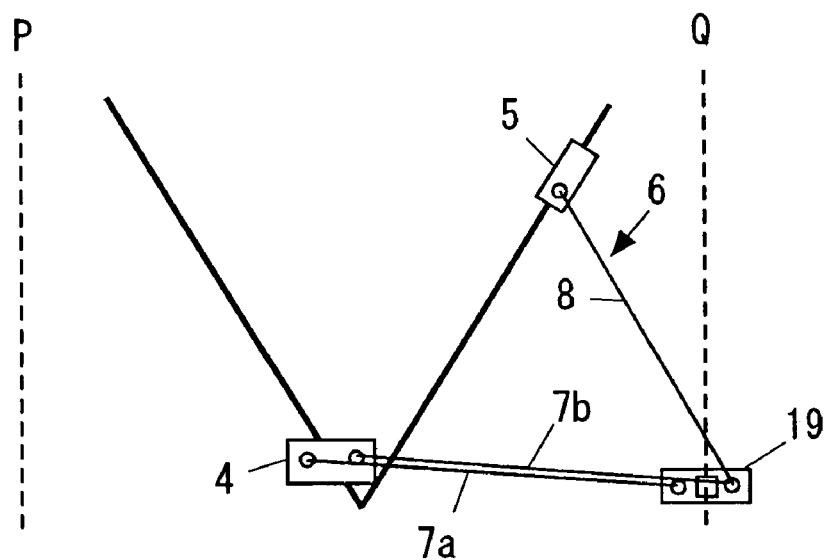
FIG. 13 is a diagram wherein a crossbar is moved to a panel mounting position in the panel transportation device according to the first embodiment of the present invention.

In the panel transportation device according to the first embodiment described above, when the crossbar 3 is moved to a position in the vicinity of the panel mounting position Q as shown in a schematic diagram of FIG. 13, the first slide block 4 is substantially as high as the output member 19, and the two arms 7a, 7b might thus be brought in proximity to the extent that they overlap each other when viewed in the transportation line width direction, or might overlap each other on the same straight line. In this case, since the link mechanism approaches or comes into the mechanical dead point, this could cause difficulty in controlling the link mechanism. Moreover, the two arms cross each other beyond the mechanical dead point, with the result that the link mechanism might become uncontrollable. In addition, when the second link 8 is constituted of two arms contrary to the panel transportation device of FIG. 2, it is also assumed that a similar phenomenon occurs in the vicinity of the panel grasp position P.

Therefore, it is preferable to eliminate the mechanical dead point of the link mechanism and to improve controllability in any position of the panel transportation operation.

Figure 12:
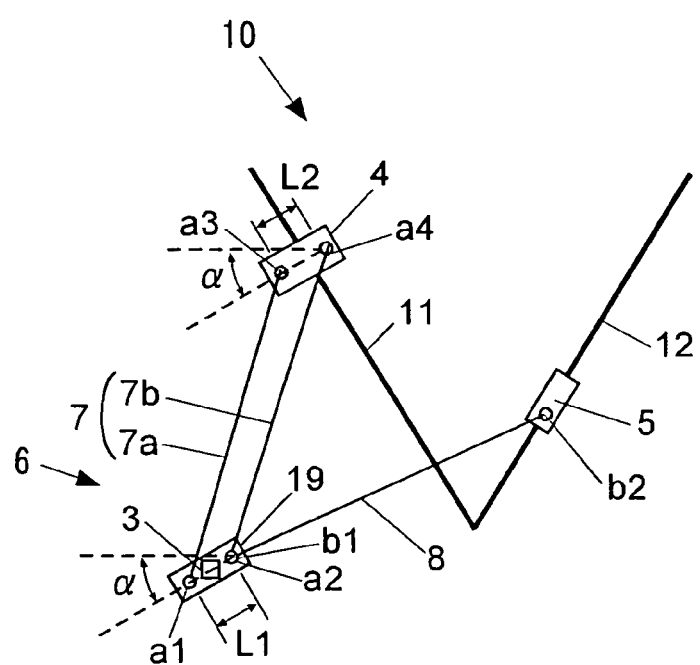
FIG. 12 is a schematic diagram showing the third embodiment of the present invention.
Figure 14:
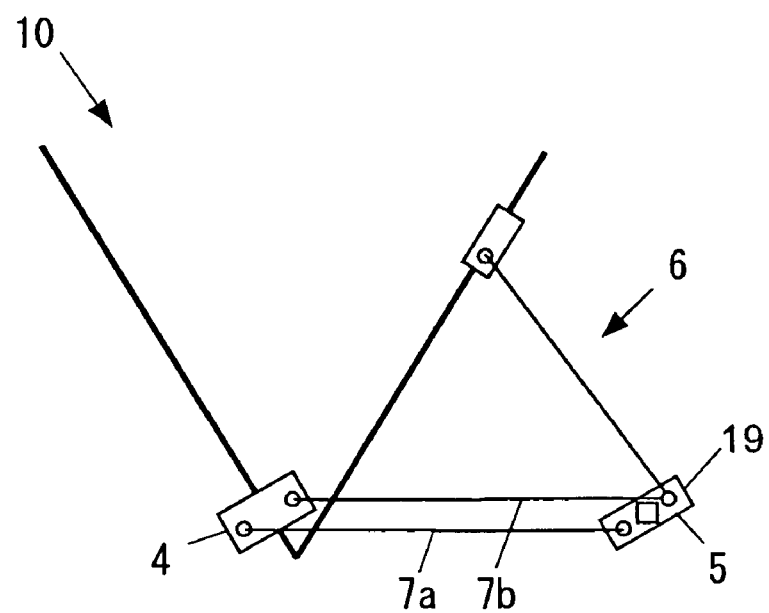
FIG. 14 is a diagram wherein the crossbar is moved to the panel mounting position in the panel transportation device according to the third embodiment of the present invention.

Thus, in the panel transportation device according to the third embodiment of the present invention, a straight line passing the pivotal connection points a1, a2 and a straight line passing the pivotal connection points a3, a4 are inclined with respect to the horizontal plane, as shown in FIG. 12. An inclination angle α is set to an angle such that the two arms 7a, 7b can always hold a state in which they do not interfere with each other in a figure viewed from the panel transportation direction. The "state in which they do not interfere with each other" means a state in which the two arms 7a, 7b do not overlap each other on one straight line or cross each other. In the present embodiment, the angle α is set to 25 degrees, but it is not limited to this angle, and the angle α is individually set in accordance with a length of the link mechanism 6. Thus, as shown in FIG. 14, even when the output member 19 is substantially as high as the first slide block 4 in the vicinity of the panel mounting position, the first link always constructs a quadrilateral link. Therefore, since the mechanical dead point of the link mechanism 6 can be eliminated in any position of the panel transportation operation, the controllability can be significantly improved.

The distance L1 between the pivotal connection points a1, a2 is as long as the distance L2 between the pivotal connection points a3, a4. According to this configuration, since the two arms 7a, 7b are maintained in parallel, the output member 19 can always be held at a predetermined angle to the horizontal plane. On the other hand, the panel grasp portion 15 is obliquely attached to the output member 19 so as to be able to horizontally grasp the panel 1. Thus, even when the parallel link a1, a2, a4, a3 is constructed and the position of the output member 19 is changed, the output member 19 can be horizontally positioned, and horizontally held without tilting the panel grasp portion 15 (crossbar 3) attached to the output member 19. In addition, configurations of other parts are similar to those in the first embodiment. Moreover, the panel 15: transportation operation is also similar to that in the first embodiment.

According to the third embodiment of the present invention, since the first link always constructs the quadrilateral link, the mechanical dead point of the link mechanism can be eliminated in any position of the panel transportation operation. It is thus possible to obtain an advantage that the controllability can be significantly improved.

It is to be noted that similar effects to those in the first embodiment can naturally be obtained in the third embodiment.

Moreover, the case has been described in the third embodiment wherein the first link 7 constructs the parallel link. However, this is not a limitation, and in an alternative embodiment, the second link 8 may construct the parallel link to hold the panel grasp portion 15 horizontal. Further, the parallel link does not always need to be constructed depending on the shape of the output member 19 and on how the crossbar 3 is attached, in which case one of the straight line passing the pivotal connection points a1, a2 and the straight line passing the pivotal connection points a3, a4 may be inclined with respect to the horizontal plane at such an angle as to allow a state to be held in which the two arms 7a, 7b do not interfere with each other in the figure viewed from the panel transportation direction.

Figure 15:
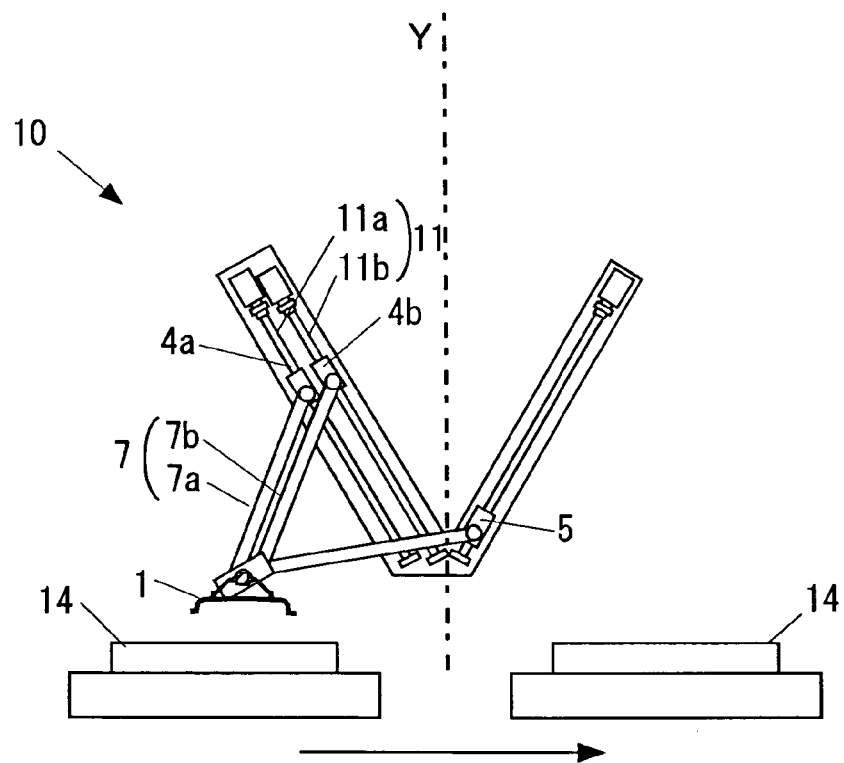
FIG. 15 is a configuration diagram showing a fourth embodiment of the present invention.

Next, a panel transportation device according to a fourth embodiment of the present invention will be described. FIG. 15 is a configuration diagram of the panel transportation device according to the fourth embodiment, and FIG. 16 is a schematic diagram thereof.

Figure 17:
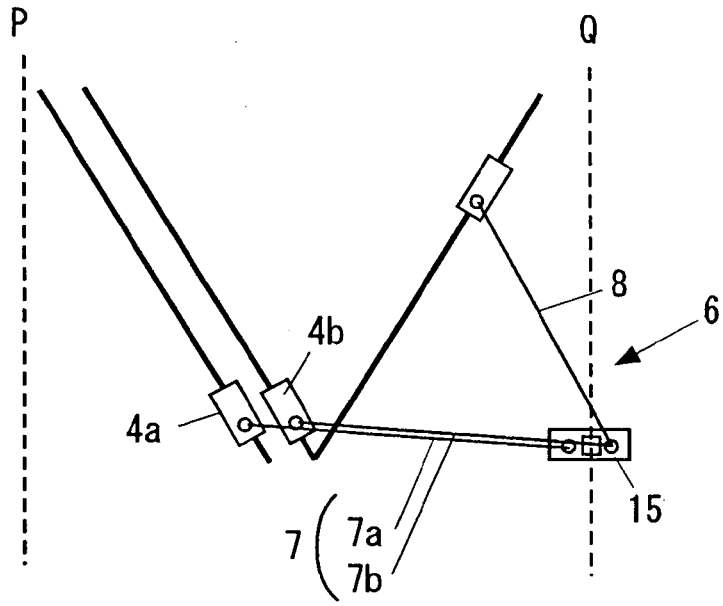
FIG. 17 is a diagram wherein the crossbar is moved to the panel mounting position in the panel transportation device according to the second embodiment of the present invention.

In the second embodiment described above, when the crossbar 3 is moved to a position in the vicinity of the panel mounting position Q as shown in a schematic diagram of FIG. 17, the first slide block 4 is also substantially as high as the output member 19, and the two arms 7a, 7b might thus be brought in proximity to the extent that they overlap each other when viewed in the transportation line width direction, or might overlap each other on the same straight line.

Figure 16:
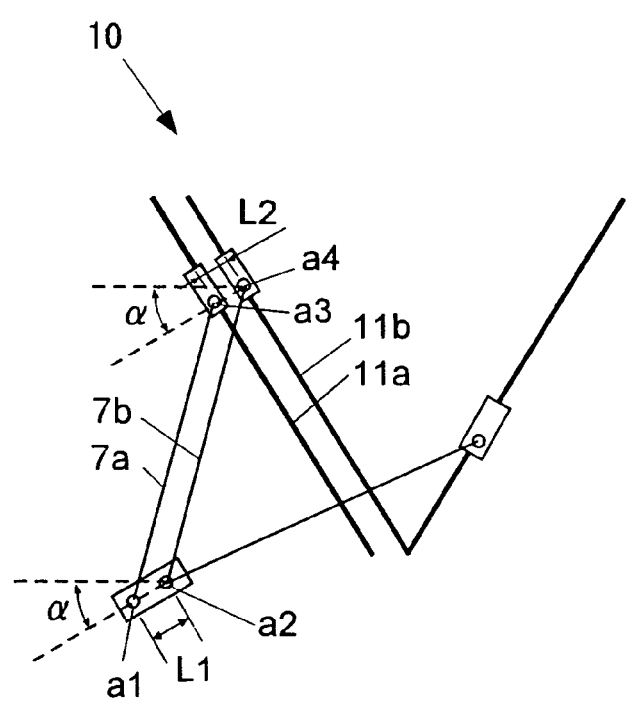
FIG. 16 is a schematic diagram showing the fourth embodiment of the present invention.

Therefore, in the fourth embodiment which is a preferred embodiment of the panel transportation device according to the second embodiment, the two slide mechanisms 11a, 11b control positions of the two slide blocks 4a, 4b so that the straight line passing the pivotal connection points a1, a2 and the straight line passing the pivotal connection points a3, a4 are inclined at a predetermined angle to the horizontal plane during normal transportation without the tilt operation, as shown in FIG. 16. At this time, the control is performed so that the two arms 7a, 7b may form the angle α allowing a state in which they do not interfere with each other in the figure viewed from the panel transportation direction. Thus, as in the third embodiment, even when the output member 19 is in the vicinity of the panel grasp position, the first link always constructs the quadrilateral link. Therefore, since the mechanical dead point of the link mechanism 6 can be eliminated in any position of the panel transportation operation, the controllability can be significantly improved. Configurations of other parts are similar to those in the second embodiment. Moreover, the panel transportation operation is also similar to that in the second embodiment.

Furthermore, in an alternative embodiment, it is also possible to have a configuration in which the second slide 5 comprises two slides, in which case configurations as shown in FIG. 15 may be built axially symmetrically with respect to the axis Y.

Figure 18:
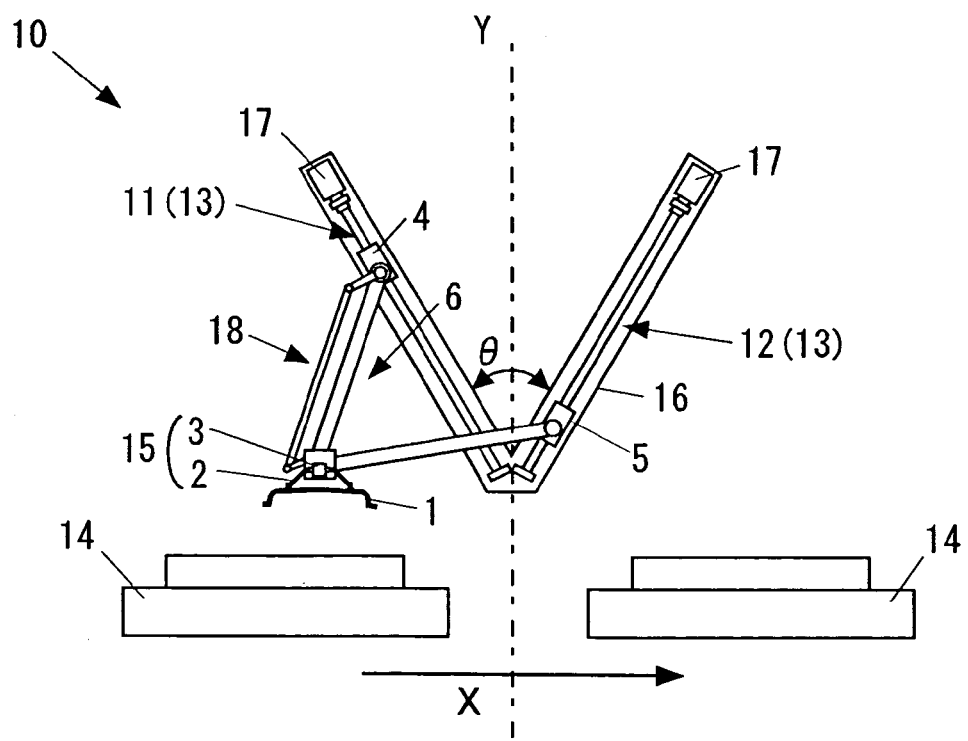
FIG. 18 is a configuration diagram showing a fifth embodiment of the present invention.

Next, a panel transportation device according to a fifth embodiment of the present invention will be described. FIG. 18 is a configuration diagram of the panel transportation device according to the fifth embodiment.

In the panel transportation device according to the second and fourth embodiments described above, a tilt mechanism to tilt the panel grasp portion 15 constructs part of the link mechanism 6. Therefore, in constructing the link mechanism 6, there are needed components similar to structural components to position the panel grasp portion 15, such as the slide block, the slide mechanism and the arm. Thus, a structure of the entire device becomes complicated.

Furthermore, in the panel transportation device according to the first and second embodiments, the link mechanism approaches or comes into the mechanical dead point, so that the link mechanism might become uncontrollable, as described with FIG. 13 and FIG. 17.

Therefore, it is preferable that the entire device can be simplified even when it comprises the tilt mechanism, and that the mechanical dead point of the link mechanism can be eliminated in any position of the panel transportation operation to improve the controllability.

Figure 19:
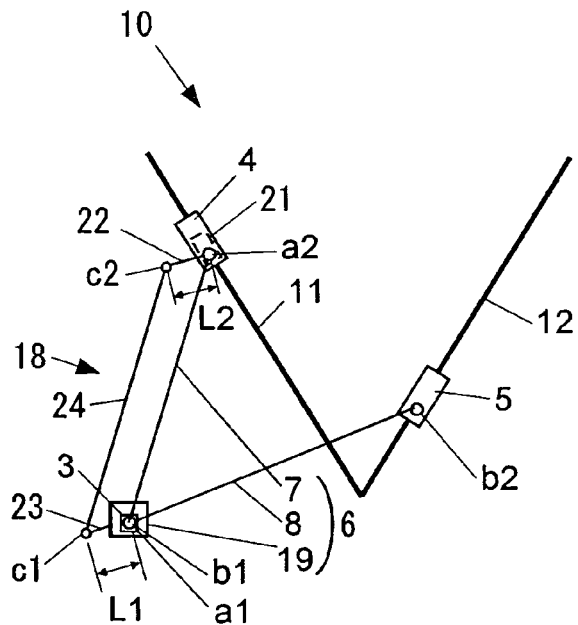
FIG. 19 is a schematic diagram showing the fifth embodiment of the present invention.

Thus, the panel transportation device according to the fifth embodiment further comprises a tilt mechanism 18 in addition to the panel grasp portion 15, the link mechanism 6 and the slide mechanism 13, as shown in FIG. 19.

The panel grasp portion 15 and the slide mechanism 13 are similar to those in the panel transportation device according to the first to fourth embodiments.

FIG. 19 is a schematic diagram of the panel transportation device 10 of FIG. 18. As shown in this drawing, the link mechanism 6 comprises the output member 19 connected to both ends of the panel grasp portion 15 (crossbar 3), and the first link 7 and the second link 8 pivotally connected to the output member 19.

The first link 7 has one end pivotally connected to the output member 19 so as to be able to rotate around the horizontal axis (its pivotal connection point is indicated by a1.) and the other end pivotally connected to the first slide block 4 so as to be able to rotate around the horizontal axis (its pivotal connection point is indicated by a2.). The second link 8 comprises an arm having a length equal to that of the first link 7, and has one end pivotally connected to the output member 19 so as to be able to rotate around the horizontal axis (its pivotal connection point is indicated by b1.) and the other end pivotally connected to the second slide block 5 so as to be able to rotate around the horizontal axis (its pivotal connection point is indicated by b2.). It is to be noted that in this drawing, the pivotal connection point a1 and the pivotal connection point b1 are located on the same axis, but they are not always needed to be on the same axis.

The tilt mechanism 18 comprises a rotary actuator 21 installed in the first slide block 4, a first arm 22, a second arm 23 and a coupling rod 24. One end of the first arm 22 is fixed to a drive shaft of the rotary actuator 21, and one end of the second arm 23 is fixed to the output member 19. The coupling rod 24 couples the first arm 22 with the second arm 23, and has one end pivotally connected to the other end of the first arm 22 so as to be able to rotate around a horizontal axis (its pivotal connection point is indicated by c2.) and the other end pivotally connected to the other end of the second arm 23 so as to be able to rotate around a horizontal axis (its pivotal connection point is indicated by c1.). According to this configuration, the rotary actuator 21 is driven, and the rotary driving of this rotary actuator 21 is transmitted via the first arm 22, the coupling rod 24 and the second arm 23, thereby tilting the panel grasp portion 15. In addition, the tilt mechanisms 18 are provided symmetrically to each other on both sides of the panel grasp portion 15 in the panel transportation device 10 shown in FIG. 18, but the tilt mechanism 18 may be provided on one side alone. Moreover, in the present embodiment, the first arm 22, the second arm 23 and the coupling rod 24 constitute a transmission mechanism in the present invention.

The distance L1 between the pivotal connection points c1, a1 is as long as the distance L2 between the pivotal connection points c2, a2, and the coupling rod 24 and the first link 7 have an equal length. Thus, a parallelogram sequentially passing the pivotal connection points c1, c2, a2, a1 is constructed, and the rotary actuator 21 is installed in and fixed to the first slide block 4 by this construction, so that the panel grasp portion 15 can be always held in a constant posture without driving the rotary actuator 21 during the normal transportation without the tilt operation. That is, if the panel grasp portion 15 is positioned to be horizontal, the panel grasp portion 15 (crossbar 3) can be held horizontal without driving the rotary actuator 21 even when the position of the output member 19 is changed.

FIGS. 20A to 20G are diagrams explaining the panel transportation operation of the panel transportation device according to the fifth embodiment of the present invention. In these drawings, P indicates the panel grasp position of the upstream press station, and Q indicates the panel mounting position on the downstream side.

Figure 20A:
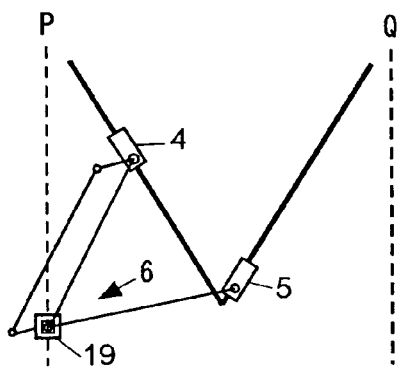
FIG. 20A is a diagram explaining a panel transportation operation of the panel transportation device according to the fifth embodiment of the present invention.

FIG. 20A shows a position where the panel in the upstream press station is grasped. From this position, the first slide block 4 and the second slide block 5 are linearly driven obliquely and upwardly at a predetermined speed, thereby lifting the position of the output member 19 to a position in FIG. 20B.

Figure 20B:
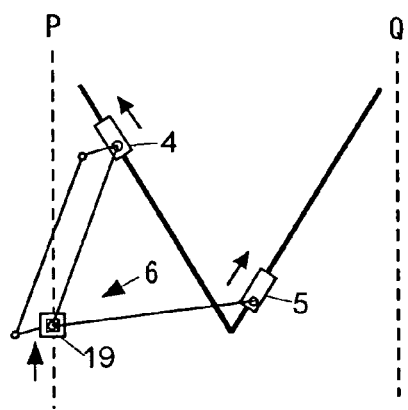
FIG. 20B is a diagram explaining the panel transportation operation of the panel transportation device according to the fifth embodiment of the present invention.
Figure 20C:
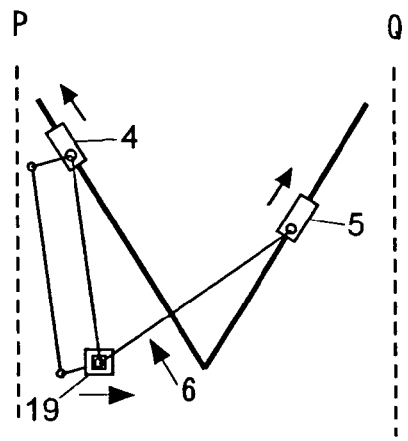
FIG. 20C is a diagram explaining the panel transportation operation of the panel transportation device according to the fifth embodiment of the present invention.
Figure 20D:
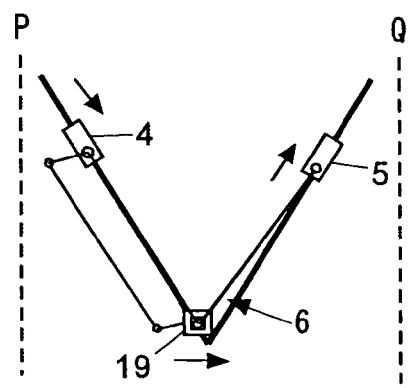
FIG. 20D is a diagram explaining the panel transportation operation of the panel transportation device according to the fifth embodiment of the present invention.

The first slide block 4 and the second slide block 5 are linearly driven obliquely and upwardly at the predetermined speed from the position in FIG. 20B to move the entire link mechanism 6 in the panel transportation direction while swiveling the link mechanism 6, thereby bringing the output member 19 attached to the tip of the link mechanism 6 to a position in FIG. 20C. At this time, each of the slide blocks 4, 5 is controlled so that the output member 19 substantially linearly moves in the panel transportation direction from the position in FIG. 20B. Subsequently, the first slide block 4 is slightly obliquely and downwardly driven and the second slide block 5 obliquely and upwardly driven, so that the link mechanism 6 further moves in the panel transportation direction while swiveling, and the output member 19 moves to a position in the vicinity of the lowermost points of the first slide mechanism 11 and the second slide mechanism 12 as shown in FIG. 20D.

Figure 20E:
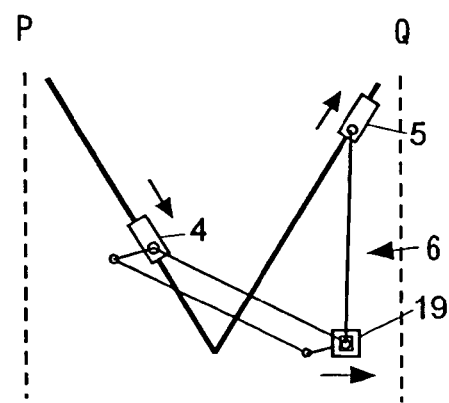
FIG. 20E is a diagram explaining the panel transportation operation of the panel transportation device according to the fifth embodiment of the present invention.
Figure 20F:
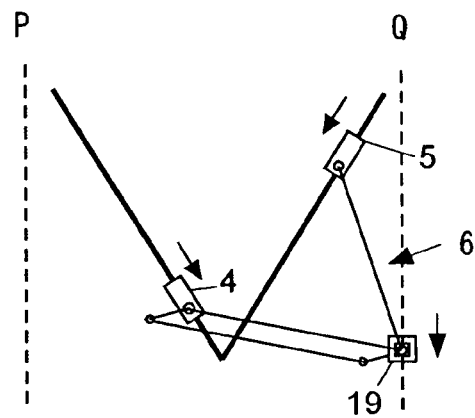
FIG. 20F is a diagram explaining the panel transportation operation of the panel transportation device according to the fifth embodiment of the present invention.
Figure 20G:
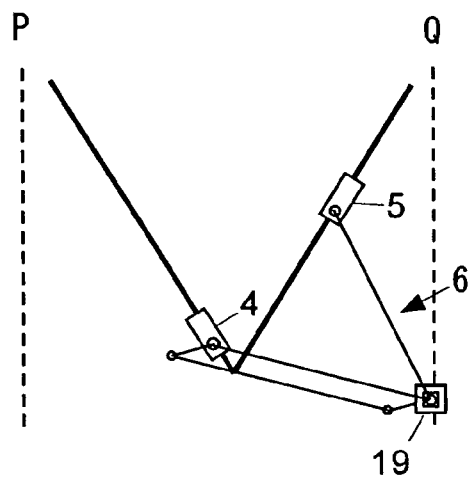
FIG. 20G is a diagram explaining the panel transportation operation of the panel transportation device according to the fifth embodiment of the present invention.

Furthermore, the first slide block 4 is obliquely and downwardly driven and the second slide block 5 is obliquely and upwardly driven, thereby linearly moving the output member 19 in the panel transportation direction to bring it to a position in FIG. 20E. Then, the first slide block 4 and the second slide block 5 are driven obliquely and downwardly at the predetermined speed to bring them to positions in FIG. 20F, and the slide blocks 4, 5 are further driven obliquely and downwardly from the positions in FIG. 20F, thus resulting in the panel mounting position in FIG. 20G.

Figure 21A:
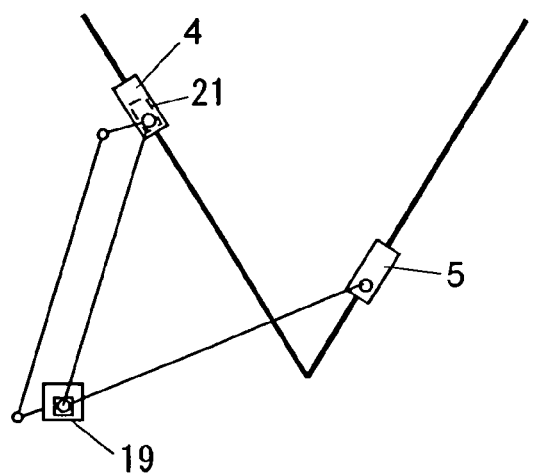
FIG. 21A is a diagram explaining a tilt operation of the panel transportation device according to the fifth embodiment of the present invention.
Figure 21B:
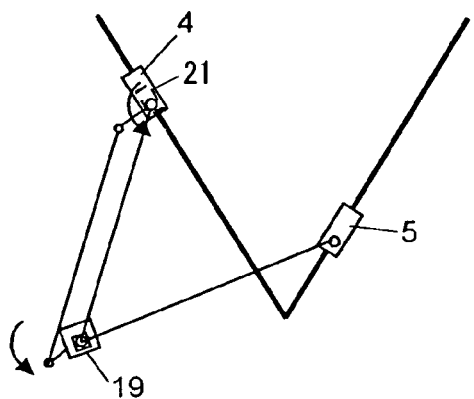
FIG. 21B is a diagram explaining the tilt operation of the panel transportation device according to the fifth embodiment of the present invention.
Figure 21C:
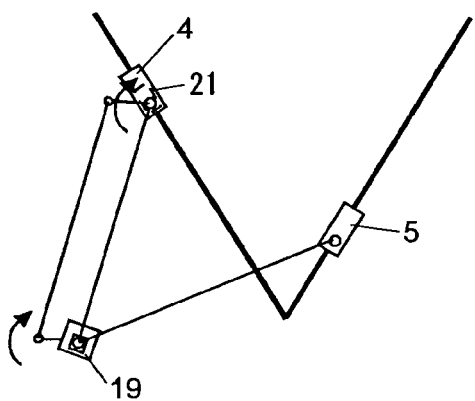
FIG. 21C is a diagram explaining the tilt operation of the panel transportation device according to the fifth embodiment of the present invention.

FIGS. 21A to 21C are diagrams explaining the tilt operation of the panel transportation device according to the fifth embodiment. Among these drawings, FIG. 21A shows a normal position when the tilt operation is not performed. When the panel grasp portion 15 is to be tilted, the rotary actuator 21 is driven in an arrow direction in the drawings, thereby operating the rotary actuator 21 as in FIG. 21B. On the other hand, when the panel grasp portion 15 is to be tilted in a direction opposite to that in FIG. 21B, the rotary actuator 21 is driven in a direction reverse to that in FIG. 21B, thereby operating the rotary actuator 21 as in FIG. 21C. Thus, the panel can be grasped/mounted at an optimum angle as required.

According to the fifth embodiment of the present invention, the tilt mechanism 18 is constituted of the rotary actuator 21 installed in the first slide block 4 and of the transmission mechanism (the first arm 22, the second arm 23 and the coupling rod 24), and the tilt mechanism can therefore be configured in a structure simpler than those in the third and fourth embodiments.

Furthermore, since the tilt mechanism 18 and the link mechanism 6 are separately configured, the mechanical dead point of the link mechanism 6 can be eliminated. Thus, the controllability is significantly improved.

It is to be noted that in the fifth embodiment, the rotary actuator 21 of the tilt mechanism 18 is installed in the first slide block 4, but the rotary actuator 21 may be installed in the second slide block 5 instead, and the panel grasp portion may be tilted by the first arm 22, the second arm 23 and the coupling rod 24 in the same manner. Moreover, the second arm 23 of the tilt mechanism 18 is fixed to the output member 19, but it may also be directly fixed to the panel grasp portion 15 (crossbar 3) to tilt the panel grasp portion 15 instead. Further, the second arm 23 may be a member integrally formed with the output member 19 or the panel grasp portion. Still further, a quadrangle sequentially passing the pivotal connection points c1, c2, a2, a1 does not always construct a parallelogram depending on the shape of the output member 19 and on how the crossbar 3 is attached.

Figure 22:
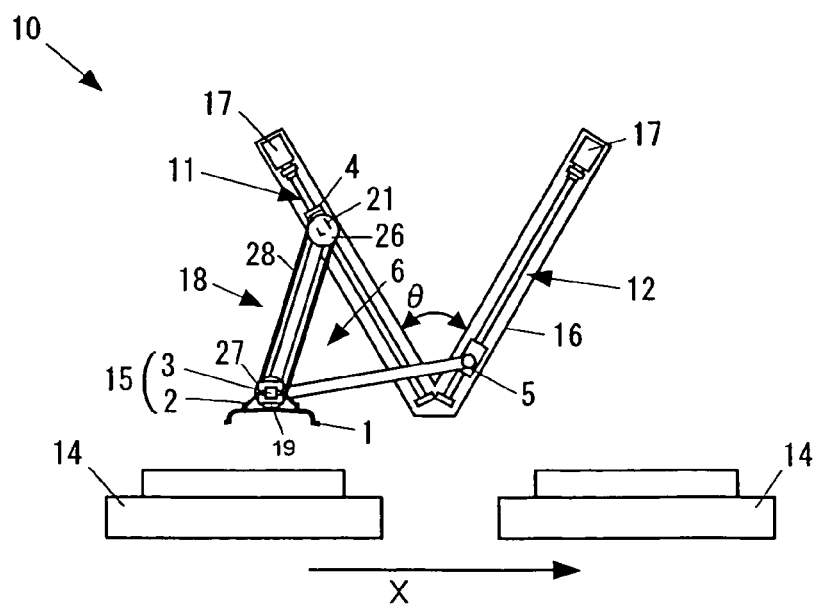
FIG. 22 is a configuration diagram showing a sixth embodiment of the present invention.

Next, a panel transportation device according to a sixth embodiment of the present invention will be described. FIG. 22 is a configuration diagram of the panel transportation device according to the sixth embodiment. In the sixth embodiment, the tilt mechanism of the panel transportation device according to the fifth embodiment has another configuration.

As shown in FIG. 22, in the sixth embodiment, the tilt mechanism 18 comprises the rotary actuator 21 installed in the first slide block 4, a first pulley 26 fixed to the drive shaft of the rotary actuator, a second pulley 27 fixed to the output member 19, and a drive belt 28 which transmits rotary driving of the first pulley 26 to the second pulley 27. A ratio of nominal diameter of the first pulley 26 to that of the second pulley 27 is 1 to 1. In the present embodiment, the first pulley 26, the second pulley 27 and the drive belt 28 constitute the transmission mechanism of the present invention. That is, in the present embodiment, a belt drive mechanism is employed as the transmission mechanism of the tilt mechanism 18. According to this configuration, the rotary actuator 21 is driven, and the rotary driving of this rotary actuator 21 is transmitted via the first pulley 26, the drive belt 28 and the second pulley 27, thereby tilting the panel grasp portion 15. Configurations of other parts are similar to those in the fifth embodiment.

Figure 23:
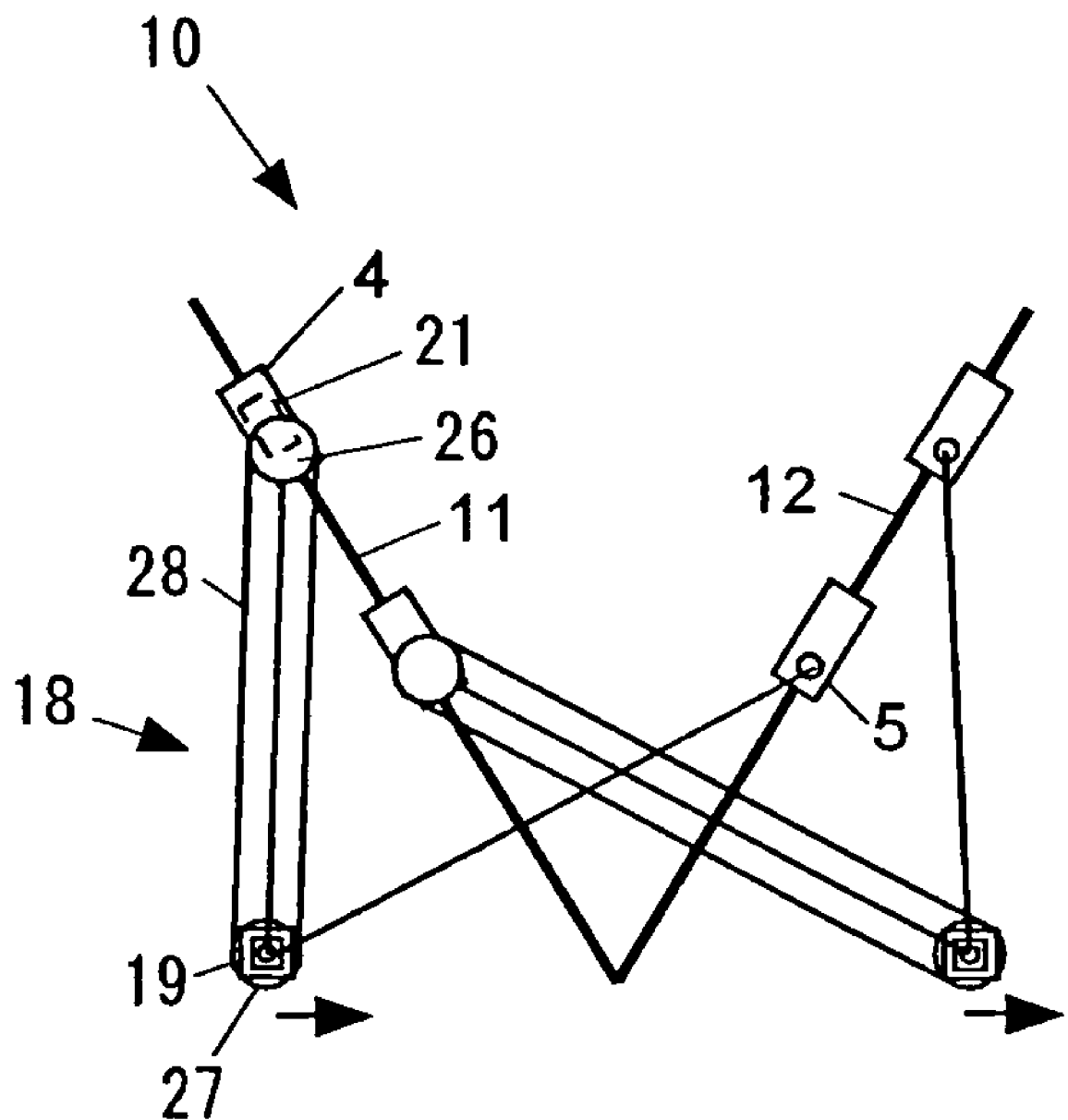
FIG. 23 is a schematic diagram showing the sixth embodiment of the present invention.

FIG. 23 simply shows the panel transportation operation of the panel transportation device according to the sixth embodiment of the present invention. FIG. 23 shows the panel transportation operation during the normal transportation without the tilt operation. As shown therein, function of the belt drive mechanism allows the panel grasp portion 15 to be always held in a constant posture in any position without driving the rotary actuator 21. That is, the ratio of the nominal diameter of the first pulley 26 to that of the second pulley 27 is 1 to 1, so that even if the position of the output member 19 is changed, the second pulley 27 does not rotate relative to the horizontal plane unless the first pulley 26 rotates. As a result, the output member 19 is also held at a constant angle to the horizontal plane.

In the panel transportation device 10 according to the present embodiment, when the tilt operation is performed, the rotary actuator 21 may be driven in the same direction as a direction in which the panel grasp portion 15 is desired to be tilted. It is to be noted that the panel transportation operation of the panel transportation device according to the sixth embodiment is substantially similar to that in the fifth embodiment, and therefore will not be described.

Similar effects to those in the fifth embodiment can be obtained according to the sixth embodiment of the present invention.

It is to be noted that the rotary actuator 21 of the tilt mechanism 18 has been installed in the first slide block 4, but the rotary actuator 21 may be installed in the second slide block 5 instead, and the panel grasp portion 15 may be tilted by the first pulley 26, the second pulley 27 and the drive belt 28 in the same manner. Moreover, the second pulley 27 is fixed to the output member 19, but it may also be directly fixed to the panel grasp portion 15 (crossbar 3) to tilt the panel grasp portion 15 instead. Further, the second pulley 27 may be a member integrally formed with the output member 19 or the panel grasp portion.

It is to be noted that several preferred embodiments of the panel transportation device of the present invention have been described, but it will be understood that the scope of protection covered by the present invention is not limited to these embodiments. Conversely, the scope of protection of the present invention covers all improvements, modifications and equivalents included in the accompanying claims.

The invention claimed is:

1. A panel transportation device comprising:
   (a) a panel grasp portion for grasping a panel;
   (b) a link mechanism for moving the panel grasp portion in a panel transportation direction; and
   (c) a slide mechanism for operating the link mechanism so as to move the panel grasp portion in the panel transportation direction and moving the entire link mechanism,
   wherein the slide mechanism is constituted of a first slide mechanism and a second slide mechanism provided closer to a transportation line downstream side than the first slide mechanism;
   the first slide mechanism has a first slide block connected to the link mechanism, and is configured to linearly drive the first slide block,
   the second slide mechanism has a second slide block connected to the link mechanism, and is configured to linearly drive the second slide block,
   a move direction of the first slide block inclines relative to a move direction of the second slide block, and
   the link mechanism comprises
      i. an output member connected to the panel grasp portion;
      ii. a first link whose one end is pivotally connected to the output member and whose other end is pivotally connected to the first slide block; and
      iii. a second link whose one end is pivotally connected to the output member and whose other end is pivotally connected to the second slide block;
   wherein the link mechanism is constructed such that the panel grasp portion is moved in the panel transportation direction by individually and linearly driving the first slide block and the second slide block.

2. The panel transportation device according to claim 1, characterized in that a pair of link mechanisms and a pair of slide mechanisms are provided symmetrically to each other on both sides of the panel grasp portion.

3. The panel transportation device according to claim 1, characterized in that the first slide block is linearly driven in a direction inclined with respect to a horizontal plane so that the first slide block is at a high position on a transportation line upstream side and at a low position on the transportation line downstream side within a driving region of the first slide block; and
   the second slide block is linearly driven in a direction inclined with respect to the horizontal plane so that the second slide block is at a low position on the transportation line upstream side and at a high position on the transportation line downstream side within a driving region of the second slide block.

4. The panel transportation device according to claim 1, characterized in that the first link comprises two arms, and each of the two arms has one end pivotally connected to the output member and the other end pivotally connected to the first slide block.

5. The panel transportation device according to claim 4, characterized in that the first slide block is constituted of two slide blocks; the first slide mechanism comprises two driving means for individually driving the two slide blocks; the other ends of the two arms are pivotally connected to the two slide blocks; and relative positions of the two slide blocks are changed to tilt the panel grasp portion connected to the output member.

6. The panel transportation device according to claim 4, characterized in that a straight line passing pivotal connection points of the two arms and the first slide block, or a straight line passing pivotal connection points of the two arms and the output member, is inclined with respect to the horizontal plane so as to always hold a state where the two arms do not interfere with each other in a plane viewed from a transportation line width direction, or characterized in that the straight line passing pivotal connection points of the two arms and the first slide block and the straight line passing pivotal connection points of the two arms and the output member are inclined with respect to the horizontal plane so as to always hold a state where the two arms do not interfere with each other in the plane viewed from the transportation line width direction.

7. The panel transportation device according to claim 5, characterized in that a straight line passing pivotal connection points of the two arms and the first slide block, or a straight line passing pivotal connection points of the two arms and the output member, is inclined with respect to the horizontal plane so as to always hold a state where the two arms do not interfere with each other in a plane viewed from a transportation line width direction, or characterized in that the straight line passing pivotal connection points of the two arms and the first slide block and the straight line passing pivotal connection points of the two arms and the output member are inclined with respect to the horizontal plane so as to always hold a state where the two arms do not interfere with each other in the plane viewed from the transportation line width direction.

8. The panel transportation device according to claim 1, characterized in that the second link comprises two arms, and each of the two arms has one end pivotally connected to the output member and the other end pivotally connected to the second slide block.

9. The panel transportation device according to claim 8, characterized in that the second slide block is constituted of two slide blocks; the second slide mechanism comprises two driving means for individually driving the two slide blocks; the other ends of the two arms are pivotally connected to the two slide blocks; and relative positions of the two slide blocks are changed to tilt the panel grasp portion connected to the output member.

10. The panel transportation device according to claim 8, characterized in that a straight line passing pivotal connection points of the two arms and the second slide block, or a straight line passing pivotal connection points of the two arms and the output member, is inclined with respect to the horizontal plane so as to always hold a state where the two arms do not interfere with each other in a plane viewed from a transportation line width direction, or characterized in that the straight line passing pivotal connection points of the two arms and the second slide block and the straight line passing pivotal connection points of the two arms and the output member are inclined with respect to the horizontal plane so as to always hold a state where the two arms do not interfere with each other in the plane viewed from the transportation line width direction.

11. The panel transportation device according to claim 3, further comprising
(d) a tilt mechanism for tilting the panel grasp portion, characterized in that the tilt mechanism comprises
i. a rotary actuator installed in the first slide block or the second slide block; and
ii. a transmission mechanism for transmitting rotary driving of the rotary actuator to tilt the panel grasp portion.

12. The panel transportation device according to claim 11, characterized in that the transmission mechanism comprises a first pulley fixed to the drive shaft of the rotary actuator, a second pulley fixed to or integrally formed in the output member or the panel grasp portion, and a drive belt for transmitting rotary driving of the first pulley to the second pulley.

13. The panel transportation device according to claim 3, characterized in that the first slide mechanism and the second slide mechanism comprise direct acting actuators which linearly drive the first slide block and the second slide block.

14. The panel transportation device according to claim 13, characterized in that the direct acting actuator is a ball screw with a ball nut, a timing belt, a hydraulic cylinder, a rack and pinion, or a linear motor.

15. The panel transportation device according to claim 14, characterized in that the panel grasp portion comprises a crossbar connected to the link mechanism, and a work grasp portion attached to the crossbar.

16. The panel transportation device according to claim 1, wherein the link mechanism is constructed such that the first slide block and the second slide block are connected to the panel grasp portion.

17. A panel transportation device comprising:
(a) a panel grasp portion for grasping a panel;
(b) a link mechanism for moving the panel grasp portion in a panel transportation direction; and
(c) a slide mechanism for operating the link mechanism so as to move the panel grasp portion in the panel transportation direction and moving the entire link mechanism,
wherein the slide mechanism is constituted of a first slide mechanism and a second slide mechanism provided closer to a transportation line downstream side than the first slide mechanism;
the first slide mechanism has a first slide block connected to the link mechanism, and is configured to linearly drive the first slide block,
the second slide mechanism has a second slide block connected to the link mechanism, and is configured to linearly drive the second slide block, wherein the second slide block is constituted of two slide blocks and the second slide mechanism comprises two driving means for individually driving the two slide blocks,
a move direction of the first slide block inclines relative to a move direction of the second slide block, and
the link mechanism comprises
i. an output member connected to the panel grasp portion;
ii. a first link whose one end is pivotally connected to the output member and whose other end is pivotally connected to the first slide block; and
iii. a second link whose one end is pivotally connected to the output member and whose other end is pivotally connected to the second slide block, wherein the second link comprises two arms, and each of the two arms has one end pivotally connected to the output member and the other end pivotally connected to the second slide block;

wherein the link mechanism is constructed such that the panel grasp portion is moved in the panel transportation direction by individually and linearly driving the first slide block and the second slide block, and the other ends of the two arms are pivotally connected to the two slide blocks of the second slide block, and relative positions of the two slide blocks are changed to tilt the panel grasp portion connected to the output member, and wherein a straight line passing pivotal connection points of the two arms and the second slide block, or a straight line passing pivotal connection points of the two arms and the output member, is inclined with respect to the horizontal plane so as to always hold a state where the two arms do not interfere with each other in a plane viewed from a transportation line width direction, or wherein the straight line passing pivotal connection points of the two arms and the second slide block and the straight line passing pivotal connection points of the two arms and the output member are inclined with respect to the horizontal plane so as to always hold a state where the two arms do not interfere with each other in the plane viewed from the transportation line width direction.

18. A panel transportation device comprising:
(a) a panel grasp portion for grasping a panel;
(b) a link mechanism for moving the panel grasp portion in a panel transportation direction;
(c) a slide mechanism for operating the link mechanism so as to move the panel grasp portion in the panel transportation direction and moving the entire link mechanism; and
(d) a tilt mechanism for tilting the panel grasp portion, wherein the tilt mechanism comprises
  i. a rotary actuator installed in a first slide block or a second slide block; and
  ii. a transmission mechanism for transmitting rotary driving of the rotary actuator to tilt the panel grasp portion, wherein the transmission mechanism comprises a first arm whose one end is fixed to a drive shaft of the rotary actuator, a second arm whose one end is fixed to or integrally formed in an output member or the panel grasp portion, and a coupling rod whose one end is pivotally connected to the other end of the first arm and whose other end is pivotally connected to the other end of the second arm and which couples the first arm with the second arm;

wherein the slide mechanism is constituted of a first slide mechanism and a second slide mechanism provided closer to a transportation line downstream side than the first slide mechanism;

the first slide mechanism has the first slide block connected to the link mechanism, and is configured to linearly drive the first slide block, the second slide mechanism has the second slide block connected to the link mechanism, and is configured to linearly drive the second slide block, a move direction of the first slide block inclines relative to a move direction of the second slide block, and the link mechanism comprises
  i. the output member connected to the panel grasp portion;
  ii. a first link whose one end is pivotally connected to the output member and whose other end is pivotally connected to the first slide block; and
  iii. a second link whose one end is pivotally connected to the output member and whose other end is pivotally connected to the second slide block;

wherein the link mechanism is constructed such that the panel grasp portion is moved in the panel transportation direction by individually and linearly driving the first slide block and the second slide block, and wherein the first slide block is linearly driven in a direction inclined with respect to a horizontal plane so that the first slide block is at a high position on a transportation line upstream side and at a low position on the transportation line downstream side within a driving region of the first slide block; and the second slide block is linearly driven in a direction inclined with respect to the horizontal plane so that the second slide block is at a low position on the transportation line upstream side and at a high position on the transportation line downstream side within a driving region of the second slide block.

* * * * *